(12) United States Patent
Kato et al.

(10) Patent No.: US 10,356,361 B2
(45) Date of Patent: Jul. 16, 2019

(54) COMMUNICATION TERMINAL, COMMUNICATION SYSTEM, AND DISPLAY METHOD

(71) Applicant: RICOH COMPANY, Ltd., Ohta-Ku (JP)

(72) Inventors: Yoshinaga Kato, Kanagawa (JP); Ayako Watanabe, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/704,488

(22) Filed: Sep. 14, 2017

(65) Prior Publication Data
US 2018/0084222 A1    Mar. 22, 2018

(30) Foreign Application Priority Data

Sep. 16, 2016  (JP) .................................. 2016-181879
Jul. 13, 2017  (JP) .................................. 2017-137009

(51) Int. Cl.
| | |
|---|---|
| *H04M 7/00* | (2006.01) |
| *H04N 7/14* | (2006.01) |
| *H04N 7/15* | (2006.01) |
| *H04N 5/445* | (2011.01) |
| *H04L 12/18* | (2006.01) |
| *H04L 29/08* | (2006.01) |

(52) U.S. Cl.
CPC ......... *H04N 7/147* (2013.01); *H04L 12/1822* (2013.01); *H04M 7/0027* (2013.01); *H04N 5/44504* (2013.01); *H04N 7/15* (2013.01); *H04L 67/141* (2013.01)

(58) Field of Classification Search
USPC ............................................ 348/14.01–14.09
See application file for complete search history.

(56) References Cited

U.S. PATENT DOCUMENTS

| | | | | |
|---|---|---|---|---|
| 8,589,971 | B1 * | 11/2013 | Kellum | ................ H04N 21/462 725/32 |
| 2004/0236830 | A1 * | 11/2004 | Nelson | .............. H04L 29/06027 709/204 |
| 2006/0181750 | A1 | 8/2006 | Lu et al. | |
| 2007/0070473 | A1 | 3/2007 | Lu et al. | |

(Continued)

OTHER PUBLICATIONS

U.S. Appl. No. 15/526,534, filed Jan. 14, 2016, Yoshinaga Kato.
U.S. Appl. No. 15/656,055, filed Jul. 21, 2017, Yoshinaga Kato.

*Primary Examiner* — Maria El-Zoobi
(74) *Attorney, Agent, or Firm* — XSENSUS LLP

(57) ABSTRACT

A communication terminal includes a receiver and circuitry. The receiver receives first content data from a counterpart communication terminal with a first communication; and receives second content data from the counterpart communication terminal with a second communication. The circuitry controls a display to display the first image generated based on the first content data, the second image generated based on the second content data, one of the first image and the second image being superimposed on the other one of the first image and the second image, a first instruction image for accepting a first instruction to display one of the first image and the second image, and a second instruction image for accepting a second instruction to end the first communication and the second communication with the counterpart communication terminal.

12 Claims, 22 Drawing Sheets

(56) References Cited

U.S. PATENT DOCUMENTS

| | | |
|---|---|---|
| 2007/0115491 A1 | 5/2007 | Kato et al. |
| 2007/0133073 A1 | 6/2007 | Shida et al. |
| 2010/0046044 A1 | 2/2010 | Ishizu et al. |
| 2010/0066749 A1 | 3/2010 | Mihara et al. |
| 2011/0205331 A1 | 8/2011 | Kato |
| 2011/0317223 A1 | 12/2011 | Nagao et al. |
| 2012/0026279 A1 | 2/2012 | Kato |
| 2012/0140022 A1 | 6/2012 | Kato et al. |
| 2013/0070297 A1 | 3/2013 | Kato |
| 2013/0242030 A1 | 9/2013 | Kato et al. |
| 2013/0242033 A1 | 9/2013 | Kato et al. |
| 2013/0242034 A1 | 9/2013 | Kato et al. |
| 2013/0271557 A1 | 10/2013 | Kato et al. |
| 2014/0015917 A1 | 1/2014 | Kato |
| 2014/0043431 A1 | 2/2014 | Kato |
| 2014/0071225 A1 | 3/2014 | Uchiyama et al. |
| 2014/0104373 A1 | 4/2014 | Kato |
| 2014/0118470 A1 | 5/2014 | Kato et al. |
| 2014/0118476 A1 | 5/2014 | Nagase et al. |
| 2014/0253676 A1 | 9/2014 | Nagase et al. |
| 2014/0267565 A1 | 9/2014 | Nakafuji et al. |
| 2014/0293000 A1 | 10/2014 | Ujiie et al. |
| 2014/0313283 A1 | 10/2014 | Kato et al. |
| 2015/0015786 A1 | 1/2015 | Watanabe |
| 2015/0049237 A1 | 2/2015 | Ujiie et al. |
| 2015/0077369 A1* | 3/2015 | Nagahara .............. G06F 3/0488 345/173 |
| 2015/0077511 A1 | 3/2015 | Mihara et al. |
| 2015/0092005 A1 | 4/2015 | Kato et al. |
| 2015/0116602 A1 | 4/2015 | Watanabe |
| 2015/0199946 A1 | 7/2015 | Kato |
| 2015/0222855 A1 | 8/2015 | Kato |
| 2015/0296176 A1 | 10/2015 | Kato |
| 2016/0007000 A1 | 1/2016 | Watanabe |
| 2016/0021340 A1 | 1/2016 | Kato |
| 2016/0105642 A1 | 4/2016 | Nagase et al. |
| 2016/0127686 A1 | 5/2016 | Nagase et al. |
| 2016/0149960 A1 | 5/2016 | Kato |
| 2016/0165180 A1 | 6/2016 | Kato et al. |
| 2016/0259434 A1 | 9/2016 | Kato |
| 2016/0294571 A1 | 10/2016 | Kato et al. |
| 2016/0295162 A1 | 10/2016 | Kato |
| 2016/0295354 A1 | 10/2016 | Kato et al. |
| 2016/0295626 A1 | 10/2016 | Kato et al. |
| 2016/0343347 A1 | 11/2016 | Kato |
| 2016/0352787 A1 | 12/2016 | Kato |
| 2016/0366371 A1 | 12/2016 | Kato et al. |
| 2017/0017592 A1 | 1/2017 | Kato |
| 2017/0048488 A1* | 2/2017 | Novak .................... H04N 7/147 |
| 2017/0090843 A1 | 3/2017 | Kato et al. |
| 2017/0171511 A1 | 6/2017 | Kato et al. |
| 2017/0201718 A1 | 7/2017 | Kato et al. |
| 2017/0214809 A1 | 7/2017 | Kato et al. |
| 2017/0249764 A1 | 8/2017 | Fujii et al. |
| 2017/0302887 A1* | 10/2017 | Nelson .................... H04N 7/15 |

* cited by examiner

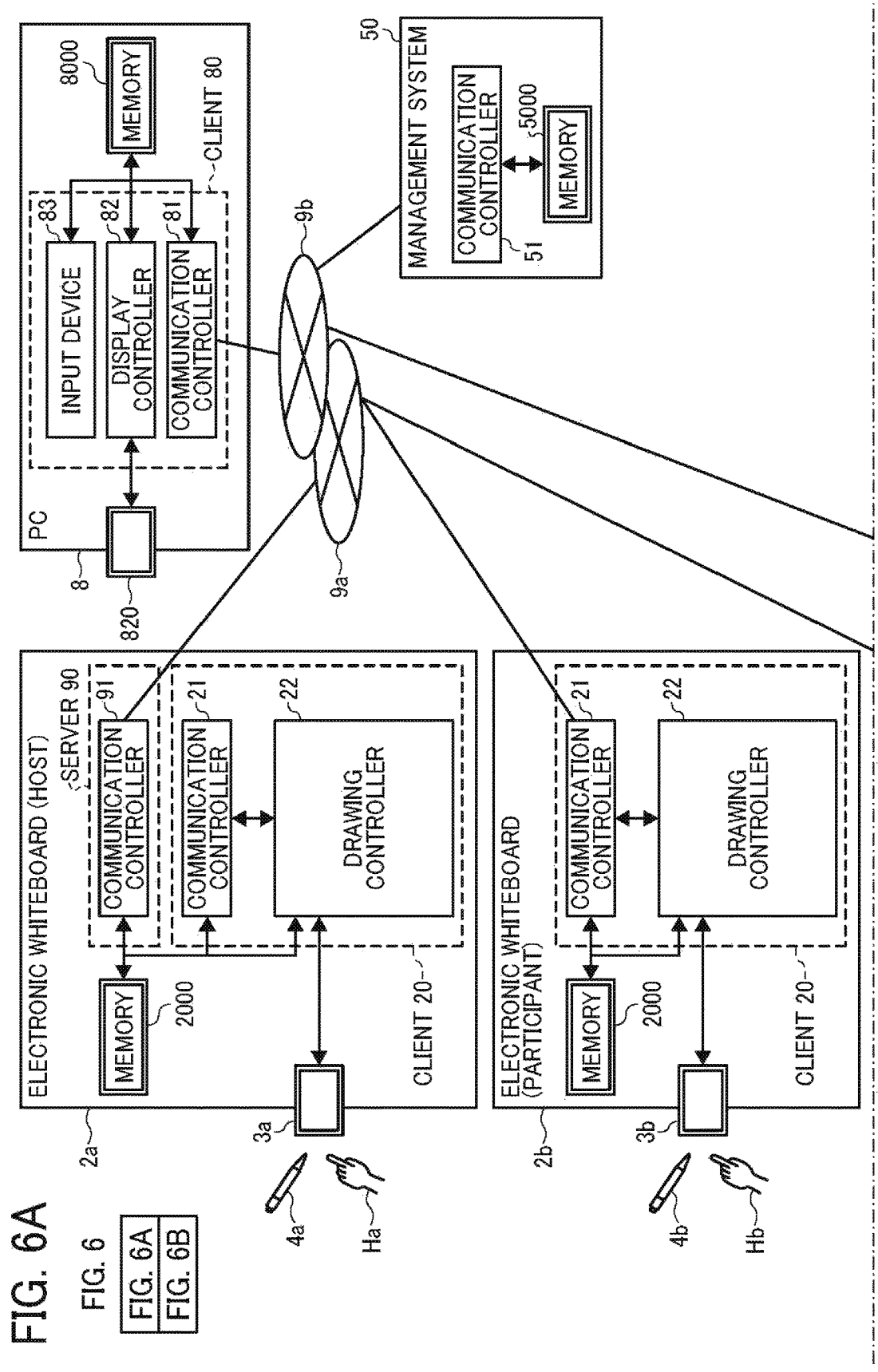

FIG. 20A

TABLE 2 st003

| COORDINATE ARRANGEMENT DATA ID |
|---|
| ⋮ |
| ⋮ |
| ⋮ |
| ⋮ | st002

| COORDINATE ARRANGEMENT DATA ID |
|---|
| ⋮ |
| ⋮ |
| ⋮ |
| ⋮ | st001

| STROKE DATA ID | START TIME | END TIME | COLOR | WIDTH | COORDINATE ARRANGEMENT DATA ID |
|---|---|---|---|---|---|
| s001 | 20150522152202 | 20150522152205 | ff0000 | 2 | c001 |
| s002 | 20150522152612 | 20150522152615 | 0000ff | 3 | c002 |
| s003 | 20150522152704 | 20150522152712 | ff0000 | 1 | c003 |
| ⋮ | ⋮ | ⋮ | ⋮ | ⋮ | ⋮ |

FIG. 20B

TABLE 3

| X COORDINATE | Y COORDINATE | DIFFERENCE TIME | PRESSURE | | |
|---|---|---|---|---|---|
| | | | c001 | c002 | c003 |
| | | | PRESSURE | PRESSURE | PRESSURE |
| 10 | 10 | 100 | 255 | ... | ... |
| 12 | 10 | 200 | 255 | ... | ... |
| 14 | 12 | 300 | 255 | ... | ... |
| ... | ... | ... | ... | ... | ... |

COMMUNICATION TERMINAL, COMMUNICATION SYSTEM, AND DISPLAY METHOD

CROSS-REFERENCE TO RELATED APPLICATIONS

This patent application is based on and claims priority pursuant to 35 U.S.C. § 119(a) to Japanese Patent Application Nos. 2016-181879, filed on Sep. 16, 2016, and 2017-137009, filed on Jul. 13, 2017, in the Japan Patent Office, the entire disclosures of which are hereby incorporated by reference herein.

BACKGROUND

Technical Field

Embodiments of the present disclosure relate to a communication terminal, a communication system, and a display method.

Related Art

To reduce the cost and time associated with business trips, communication systems are widely used, which are capable of enabling videoconferences among remotely located sites through a communication network such as the Internet. Such communication systems can transmit and receive content data among multiple communication terminals. The content data includes, for example, video image data of a videoconference participant, image data of presentation material, and stroke data reflecting drawings made by the participant.

In such a communication system, display images representing the content data including a plurality of types of data, namely the video image data, the image data, and the stroke data, are transmitted and received, during the videoconference. Accordingly, ending the videoconference requires operating several different screens, each of which corresponds to one of the plurality of types of content data.

SUMMARY

A novel communication terminal includes a receiver and circuitry. The receiver receives first content data from a counterpart communication terminal with a first communication; and receives second content data from the counterpart communication terminal with a second communication. The circuitry controls a display to display the first image generated based on the first content data, the second image generated based on the second content data, one of the first image and the second image being superimposed on the other one of the first image and the second image, a first instruction image for accepting a first instruction to display one of the first image and the second image, and a second instruction image for accepting a second instruction to end the first communication and the second communication with the counterpart communication terminal.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6A and FIG. 6B are schematic block diagrams collectively illustrating a functional configuration of the electronic whiteboard, the PC, and the management system of the communication system according to one of the embodiments;

FIGS. 20A and 20B are examples of table managed by the electronic whiteboard of the communication system of FIG. 1.

Figure 1:
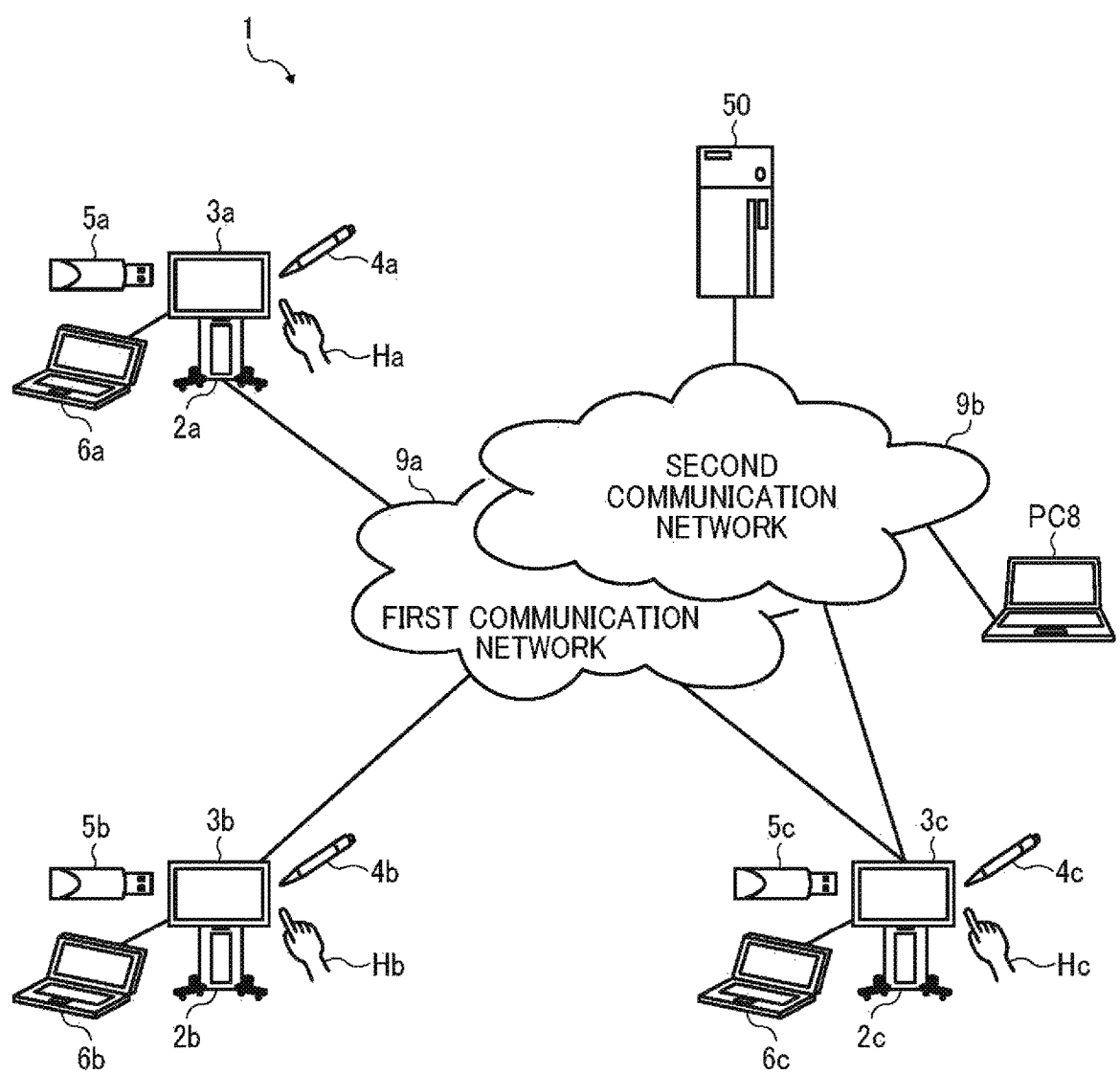
FIG. 1 is a schematic diagram illustrating an overall configuration of a communication system according to one of the embodiments.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

A first embodiment of the present disclosure is described below with reference to drawings.

«Schematic Configuration of Communication System»

Referring to FIG. 1, an overall configuration of a communication system 1 is described according to an example embodiment. FIG. 1 is a schematic diagram illustrating the communication system 1 according to the example embodiment.

The communication system 1 includes a plurality of electronic whiteboards 2a, 2b, and 2c, a personal computer (PC) 8, and a management system 50.

The electronic whiteboards 2a, 2b, and 2c are communicably connected to each other through a first communication network 9a. The electronic whiteboards 2a, 2b, and 2c are provided with displays 3a, 3b, and 3c, respectively.

The electronic whiteboards 2a, 2b, and 2c, respectively, can cause the displays 3a, 3b, and 3c to display an image that is drawn with electronic pens 4a, 4b, and 4c or the user's hands Ha, Hb, and Hc, respectively. For simplicity, any arbitrary one of the electronic whiteboards 2a, 2b, and 2c may be referred to as the electronic whiteboard 2 in the following description. Similarly, any arbitrary one of the displays 3a, 3b, and 3c may be referred to as the display 3, any arbitrary one of the electronic pens 4a, 4b, and 4c may be referred to as the electronic pen 4, and any arbitrary one of the user's hands Ha, Hb, and Hc may be referred to as the hand H in the following description. The electronic whiteboard 2 can change the image being displayed on the display 3 according to an event executed by the user's hand H. For example, the electronic whiteboard 2 may change a size of the image in response to a user's gesture indicating size enlargement or size reduction, or switch a screen being displayed in response to another user's gesture indicating turning pages. For simplicity, all of or any two of the electronic whiteboards 2a, 2b, and 2c may be collectively referred to as the electronic whiteboards 2. Similarly, all of or any two of the displays 3a, 3b, and 3c may be collectively referred to as the displays 3. All of or any two of the electronic pens 4a, 4b, and 4c may be collectively referred to as the electronic pens 4. All of or any two of the users Ha, Hb, and Hc may be collectively referred to as the hands H.

The electronic whiteboards 2a, 2b, and 2c are connectable to universal serial bus (USB) memories 5a, 5b, and 5c, respectively. The electronic whiteboards 2a, 2b, and 2c can read and write electronic files from and onto the USB memories 5a, 5b, and 5c. Such an electronic file, which may be read or written, may be in a portable document format (PDF). The electronic whiteboards 2a, 2b, and 2c are connected to note PCs 6a, 6b, and 6c, respectively, using cables. Each cable is in compliance with a standard such as DisplayPort, Digital Visual Interface (DVI), High-Definition Multimedia Interface (HDMI; Registered Trademark), or Video Graphics Array (VGA). Any arbitrary one of the USB memories 5a, 5b, and 5c may be referred to as the USB memory 5. Additionally, any arbitrary one of the note PCs 6a, 6b, and 6c may be referred to as the note PC 6.

With the configuration described above, stroke data that represents a stroke (stroke image) drawn on the display 3, captured at a first site is transmitted to a second site through the first communication network 9a to be output and displayed on the display 3 of the electronic whiteboard 2 at the second site. A term, stroke, here, indicates an image generated by drawing with the electronic pen 4 or the user's hand H on the display 3 of the electronic whiteboard 2 or, hereinafter, may indicate a single movement of the electronic pen 4 or the user's hand H on the display 3 of the electronic whiteboard 2. Similarly, the stroke data, which is an image drawn on the display 3 of the electronic whiteboard 2 at the second site, is transmitted to the first site through the first communication network 9a to be output and displayed on the display 3 at the first site. As described above, a common image can be shared and processed with remotely located sites, so that the communication system 1 with the electronic whiteboards 2 facilitates a videoconference.

In addition to the electronic whiteboard 2, the stroke data can be shared with any other desired communication terminal connected to the first communication network 9a. Examples of such communication terminal having a function of processing a stroke image, include, a PC, a videoconference terminal, a tablet, a smart phone, a digital signage, a telestrator that provides information on, for example, sports and weather, and any other image processing apparatus capable of processing an image frame such as a remote medical diagnosis system, a portable information processing device, a digital video camera, a digital still camera, and a game machine.

The electronic whiteboard 2c, the PC 8, and the management system 50 are communicably connected to each other through a second communication network 9b.

The electronic whiteboard 2c and the PC 8 communicate with each other by transmitting and receiving content data, for example, video image data and audio data, in association with the videoconference.

The management system 50 centrally manages a communication state indicating a communication between the electronic whiteboard 2c and the PC 8.

Any other communication terminal than the electronic whiteboard 2c and the PC 8 can also share video image data with the electronic whiteboard 2c and the PC 8 when being connected to the second communication network 9b. Examples of such a communication terminal, which has a function of processing video image data, include, but are not limited to, a videoconference terminal, a tablet, a smart phone, a digital signage, and a telestrator. Other examples of such a communication terminal include image processing apparatuses capable of processing an image frame, such as a portable information processing terminal, a digital video camera, a digital still camera, and a game machine.

In this embodiment, the electronic whiteboard 2c activates both a communication application for sharing stroke data, and a communication application for sharing video image data, to share the stroke data, the video image data, and the audio data among the communication terminals at the same time.

In one example, the first communication network 9a is the Intranet, and the second communication network 9b is the Internet. The first communication network 9a and the second communication network 9b may be previously determined according to communication protocol used by the communication terminals in the communication system 1, and may be selected from among the Internet, a local area network (LAN), the Intranet, and a mobile phone network. The first communication network 9a and the second communication network 9b may be the same communication network, such as the Internet.

The example illustrated in FIG. 1 uses the USB memory 5 as a memory attachable to the electronic whiteboard 2, however, any desired memory, such as a Secure Digital (SD) card, may be used.

<Hardware Configuration of Electronic Whiteboard>

Figure 2:
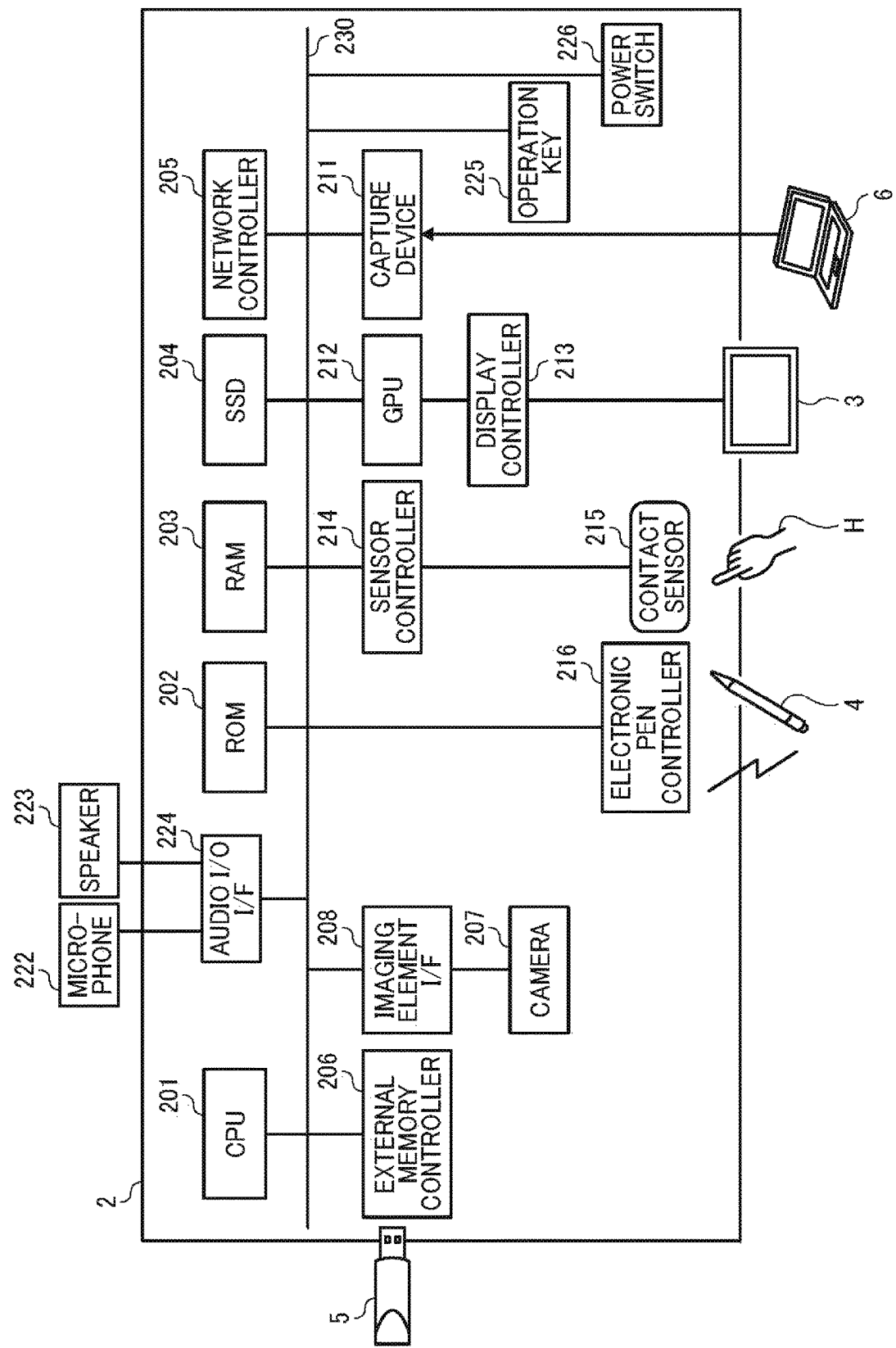
FIG. 2 is a schematic block diagram illustrating a hardware configuration of an electronic whiteboard according to one of the embodiments.

FIG. 2 is a schematic block diagram illustrating the hardware configuration of the electronic whiteboard 2 illustrated in FIG. 1.

As illustrated in FIG. 2, the electronic whiteboard 2 includes a central processing unit (CPU) 201 that controls overall operation of the electronic whiteboard 2, a read only memory (ROM) 202 that stores a program for operating the CPU 201 such as an initial program loader (IPL), a random access memory (RAM) 203 that serves as a work area for the CPU 201, a solid state drive (SSD) 204 that stores various types of data including a program for the electronic whiteboard 2, a network I/F 205 that controls communication through the first communication network 9a and the second communication network 9b, and an external memory controller 206 that controls communication with the USB memory 5. The electronic whiteboard 2 further includes a camera 207 that captures an object under control of the CPU 201, an imaging element I/F 208 that drives the camera 207, a capture device 211 that transmits image data (still or moving image) for displaying on a display of the note PC 6, a graphics processing unit (GPU) 212 that processes graphics, and a display controller 213 that controls and manages screen display to output image data from the GPU 212 to the display 3. The electronic whiteboard 2 further includes a sensor controller 214 and a contact sensor 215. The sensor controller 214 controls the contact sensor 215. The contact sensor 215 detects a touch onto the display 3 with the electronic pen 4 or the user's hand H. In this example, the contact sensor 215 senses a touch input to a specific coordinate on the display 3 using an infrared blocking method. In the method of inputting and detecting such a coordinate, the display 3 is provided with two light receiving elements disposed on both upper side ends of the display 3, and the light receiving elements emit a plurality of infrared rays in parallel to the display 3. The infrared rays emitted from the light receiving elements reflect a reflector frame and individually return to the corresponding light receiving elements through optical paths each of which is made by infrared rays when the light receiving elements emit the infrared rays. The contact sensor 215 outputs an identifier (ID) of infrared rays that are blocked by an object (such as the user's hand) after being emitted from the light receiving elements, to the sensor controller 214. Based on the ID of the infrared rays, the sensor controller 214 detects a specific coordinate that is touched. Each of the IDs described below is one of examples of identification information.

The contact sensor 215 is not limited to the one with the infrared blocking method, and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display. Alternatively, the contact sensor 215 may identify the contact position using the camera 207.

The electronic whiteboard 2 further includes an electronic pen controller 216. The electronic pen controller 216 communicates with the electronic pen 4 to detect a touch touched by the tip or bottom of the electronic pen 4 to the display 3. In addition or in alternative to detecting a touch touched by the tip or bottom of the electronic pen 4, the electronic pen controller 216 may also detect a touch touched by another part of the electronic pen 4, such as a part held by a hand.

The electronic whiteboard 2 further includes an audio input/output I/F 224 that processes audio signals input from a microphone 222 and output to a speaker 223 under control of the CPU 201, operation key(s) 225 that receives user inputs, and a power switch 226 that switches between on and off of the electronic power of the electronic whiteboard 2. The microphone 222 and the speaker 223 are externally provided in FIG. 2, however, the embodiment is not limited to this and alternatively any one of the microphone 222 and the speaker 223 may be provided in the electronic whiteboard 2.

The electronic whiteboard 2 further includes a bus line 230, such as an address bus or a data bus, which electrically connects the elements, or components, illustrated in FIG. 2 to each other.

The control program for the electronic whiteboard 2 may be stored on a computer-readable recording medium, such as a Compact Disk Read Only Memory (CD-ROM), for distribution, or stored on a server on any desired network to be downloaded.

<Hardware Configuration of Management System>

Figure 3:
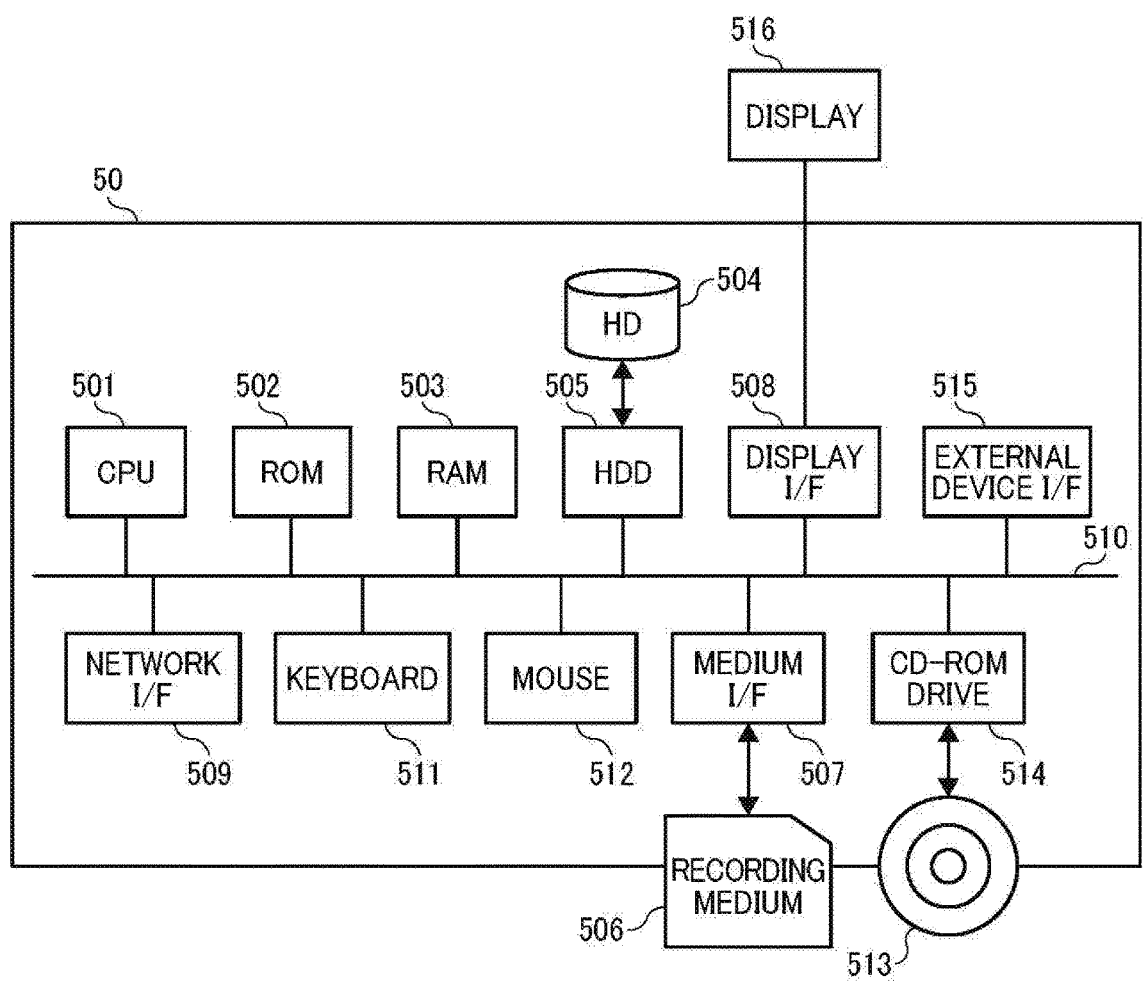
FIG. 3 is a schematic block diagram illustrating a hardware configuration of a management system according to one of the embodiments.

FIG. 3 is a schematic block diagram illustrating the hardware configuration of the management system 50 according to the example embodiment.

The management system 50 includes a CPU 501 that controls overall operation of the management system 50, a ROM 502 that stores a communication control program, a RAM 503 that operates as a work area for the CPU 501, a hard disk (HD) 504 that stores various data, a hard disk drive (HDD) 505 that controls reading and writing of various types of data from and to the HD 504 under control of the CPU 501, and a medium I/F 507 that controls reading and writing of data with respect to a recording medium 506, such as a flash memory. The management system 50 further includes a display I/F 508 that displays various types of information, such as a curser, a menu, a window, a character and an image, on a display 516, a network I/F 509 that controls transmission of data through the first communication network 9a and the second communication network 9b, a keyboard 511 provided with a plurality of keys for inputting a character, a numeral, and an instruction, and a mouse 512 that selects and executes an instruction through selection of a processing target or movement of a mouse curser. The management system 50 further includes a CD-ROM drive 514 that controls reading and writing with respect to a CD-ROM 513 as an example of removable memory, an external device I/F 515 that controls transmission of various types of data with an external device, and a bus line 510, such as an address bus or a data bus, that electrically connects the elements illustrated in FIG. 3 to each other.

Note that the communication control program may be recorded in a file in a format installable or executable on a computer-readable recording medium such as the recording medium 506 or the CD-ROM 513 for distribution. Alternatively, the communication control program may be stored on the HD 504.

<Hardware Configuration of PC>

Figure 4:
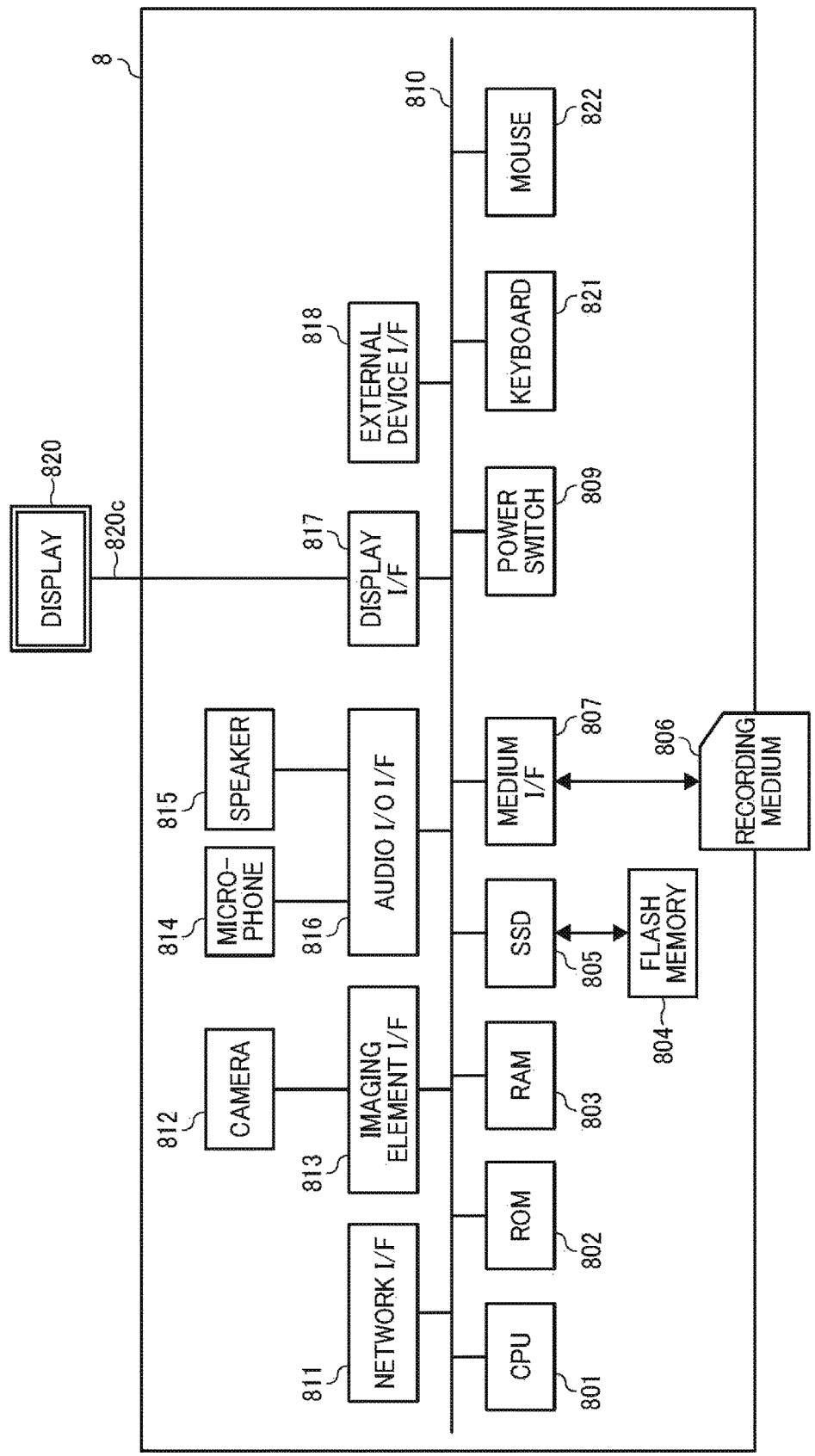
FIG. 4 is a schematic block diagram illustrating a hardware configuration of a personal computer (PC) operating as a videoconference terminal, according to one embodiment of the embodiments.

FIG. 4 is a schematic block diagram illustrating a hardware configuration of the PC 8 operating as a videoconference terminal according to the example embodiment. The PC 8 includes a central processing unit (CPU) 801, a read only memory (ROM) 802, a random access memory (RAM) 803, a flash memory 804, a solid state drive (SSD) 805, a medium interface (I/F) 807, a power switch 809, a bus line 810, a network I/F 811, a camera 812, an imaging element I/F 813, a microphone 814, a speaker 815, an audio input/output (I/O) I/F 816, a display I/F 817, an external device I/F 818, a keyboard 821, and a mouse 822. The CPU 801 controls overall operation of the PC 8. The ROM 802 stores a control program for operating the CPU 801 such as an Initial Program Loader (IPL). The RAM 803 is used as a work area for the CPU 801. The flash memory 804 stores various types of data such as a communication control program, display data, and audio data. The SSD 805 controls reading and writing of various types of data with respect to the flash memory 804 under control of the CPU 801. A hard disk drive (HDD) may be used instead of the SSD 805. The medium I/F 807 controls reading and writing of data with respect to a recording medium 806 such as a flash memory.

The network I/F 811 establishes communication for data transmission with an external device through the second communication network 9*b*. The camera 812 is an example of an imaging device capable of capturing an object for display data under control of the CPU 801, and is incorporated in the PC 8. The imaging element I/F 813 is a circuit that drives the camera 812. The microphone 814 is an example of audio collecting device capable of inputting audio under control of the CPU 801, and is incorporated in the PC 8. The audio I/O I/F 816 is a circuit for processing an audio signal inputting from the microphone 814 and outputting to the speaker 815 under the control of the CPU 801. The display I/F 817 is a circuit for transmitting display data to an external display 820 under the control of the CPU 801. The external device I/F 818 is an interface circuit that connects the PC 8 to various types of external devices. The keyboard 821 is one example of an input device provided with a plurality of keys for allowing a user to input characters, numerals, or various instructions. The mouse 822 is one example of the input device for allowing the user to select a specific instruction or execution, select a target for processing, and move a curser being displayed.

The bus line 810 is an address bus or a data bus, which electrically connects the elements, or components, including the CPU 801, illustrated in in FIG. 4 to each other.

The display 820 may be a liquid crystal or an organic electroluminescence (EL) display that displays an image of a subject, an operation icon, and the like. The display 820 is connected to the display I/F 817 using a cable 820*c*. The cable 820*c* may be an analog red green blue (RGB) (video graphic array (VGA)) signal cable, a component video cable, a high-definition multimedia interface (HDMI (registered trademark)) signal cable, or a digital video interactive (DVI) signal cable.

The camera 812 includes a lens and a solid-state imaging element that converts an image (video) of a subject into electronic data. As the solid-state imaging element, for example, a complementary metal-oxide-semiconductor (CMOS) or a charge-coupled device (CCD) is used. The external device I/F 818 is capable for connecting an external device such as an external camera, an external microphone, or an external speaker through a Universal Serial Bus (USB) cable or the like. When an external camera is connected, the external camera is driven in preference to the camera 812, which is a built-in camera, under the control of the CPU 801. Similarly, when an external microphone or an external speaker is connected, the external microphone or the external speaker is driven in preference to the microphone 814, which is a built-in microphone, or the speaker 815, which is a built-in speaker, under the control of the CPU 801.

The recording medium 806 is removable from the PC 8. Additionally, any non-volatile memory that reads and writes data under the control of the CPU 801, such as an electrically erasable and programmable read only memory (EEPROM), may be used instead of the flash memory 804.

<Software Configuration>

Figure 5A:
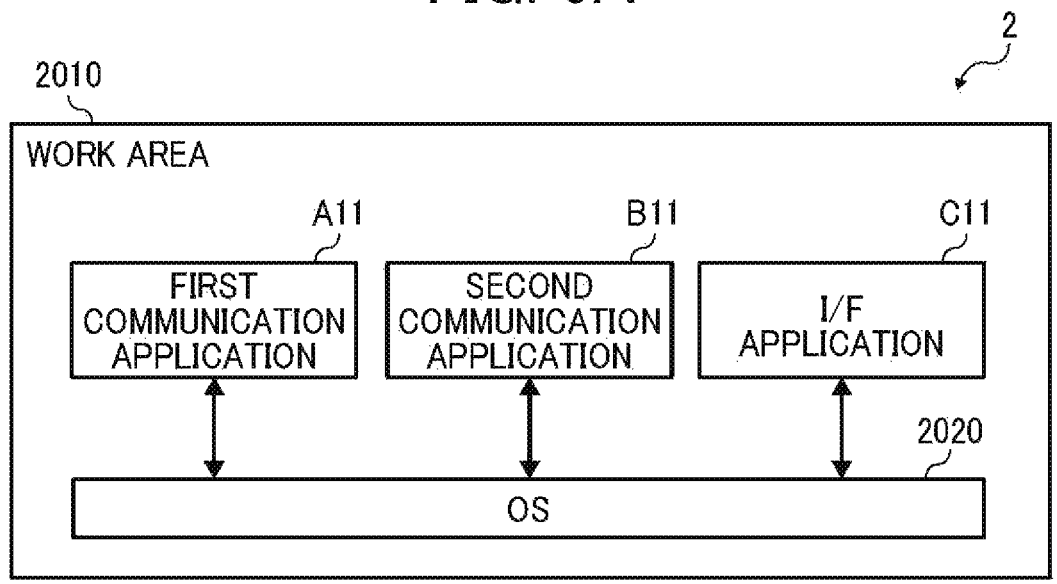
FIG. 5A and FIG. 5B are schematic block diagrams, respectively, illustrating a software configuration of the electronic whiteboard and a software configuration of the PC according to one of the embodiments.

FIG. 5A is a schematic block diagram illustrating a software configuration of the electronic whiteboard 2 according to the embodiment. As illustrated in FIG. 5A, the electronic whiteboard 2 is installed with an operating system (OS) 2020, a first communication application A11, a second communication application B11, and an I/F application C11, each of which operates in a work area 2010 of the RAM 203.

The OS 2020 is basic software that provides basic functions and controls the electronic whiteboard 2. The first communication application A11 and the second communication application B11 enable the electronic whiteboard 2 to communicate with other communication terminals, and the first communication application A11 and the second communication application B11 individually use communication protocol that is different from each other. The first communication application A11 is a client application that provides the electronic whiteboard 2 with a communication control function of transmitting stroke data to be shared with the other communication terminals, and an image processing function of outputting the stroke data as an image. The second communication application B11 is a client application that provides the electronic whiteboard 2 with a communication control function of transmitting video image data and audio data to be used for a videoconference, a video image processing function of inputting and outputting the video image data, and an audio processing function of inputting and outputting the audio data. The I/F application C11 communicates with the first communication application A11 and the second communication application B11 activated in the same electronic whiteboard 2 and generates user interface (UI) images provided by the first communication application A11 and the second communication application B11.

The OS 2020 and the first communication application A11 are installed onto the electronic whiteboards 2*a*, 2*b*, and 2*c* before shipment. The second communication application B11 and the I/F application C11 may be installed onto the electronic whiteboard 2 after the shipment. In the following description, it is assumed that the electronic whiteboard 2*c* is installed with the second communication application B11 and the I/F application C11. The electronic whiteboards 2*a* and 2*b* are not installed with the second communication application B11 and the I/F application C11.

Figure 5B:
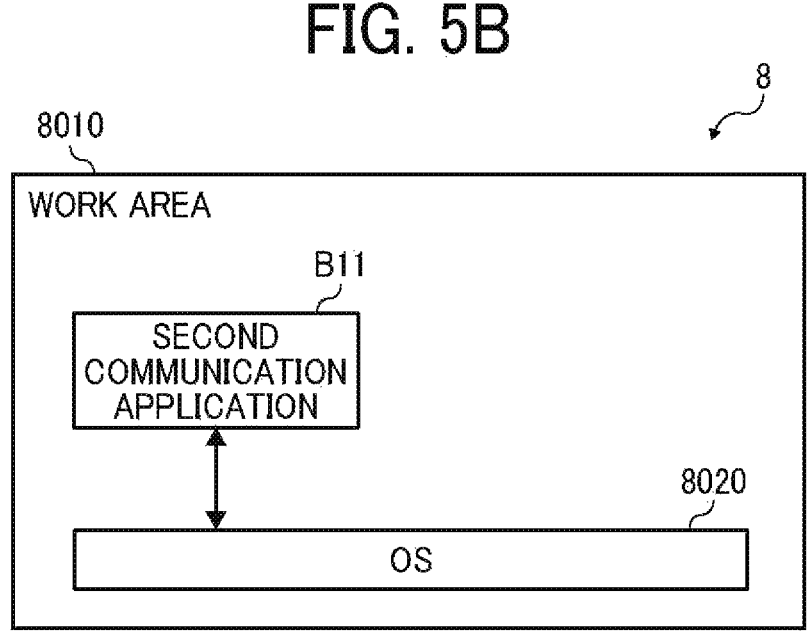

FIG. 5B is a schematic block diagram illustrating a software configuration of the PC 8 according to the example embodiment. As illustrated in FIG. 5B, the PC 8 is installed with an operating system (OS) 8020 and the second communication application B11, which may be deployed on a work area 8010 of the RAM 803.

The OS 8020 is basic software that provides basic functions and controls the PC 8. The second communication application B11 provides the PC 8 with a communication control function of transmitting video image data for a videoconference and a video image processing function of outputting the video image data as an image.

The OS 8020 and the second communication application B11 are installed onto the PC 8 before or after shipment.

«Functional Configuration of Embodiment»

Now, a functional configuration of the communication system 1 is described according to the example embodiment.

Figure 6B:
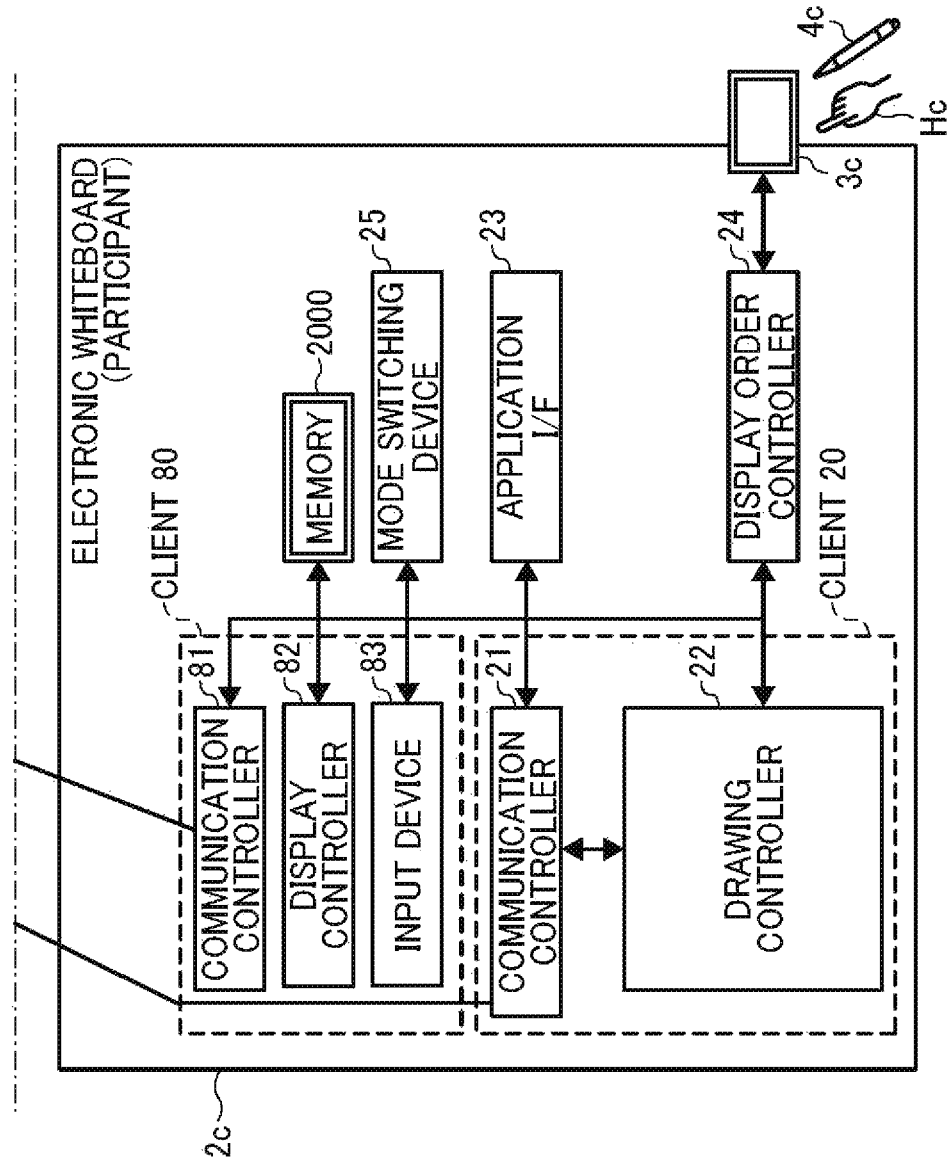

FIG. 6A and FIG. 6B are schematic block diagrams collectively illustrating the functional configuration of the electronic whiteboards 2, the PC 8, and the management system 50 of the communication system 1. In FIG. 6A, the electronic whiteboards 2a, 2b, and 2c are connected to each other through the first communication network 9a for data communication. In FIG. 6A and FIG. 6B, the electronic whiteboard 2c, the PC 8, and the management system 50 are connected to each other through the second communication network 9b for data communication.

The electronic whiteboard 2 includes hardware of FIG. 2, which operates in cooperation with the control program, to implement the functional configuration of FIG. 6A and FIG. 6B. The electronic whiteboard 2 includes a memory 2000 implemented with the SSD 204. The PC 8 includes the hardware of FIG. 4, which operates in cooperation with the control program, to implement the functional configuration of FIG. 6A. The PC 8 includes a memory 8000 implemented with the SSD 805.

The electronic whiteboard 2 may function as a "host terminal" that requests to start communication to share images, or a "participant terminal" that participates in communication started by the host terminal. The electronic whiteboard 2 mainly includes a client section ("client") 20 and a server section ("server") 90. Each of the client 20 and the server 90 is a function implemented by activating the first communication application A11 in the electronic whiteboard 2. Alternatively, the electronic whiteboard 2 may have a function of the client 20, while other apparatus, such as a distribution control apparatus, may have the function of the server 90.

The electronic whiteboard 2 that operates as the host terminal implements both the client 20 and the server 90. The electronic whiteboard 2 that operates as the participant terminal implements the client 20 but not the server 90. For example, when the electronic whiteboard 2a operates as the host terminal, and the electronic whiteboards 2b and 2c operate as the participant terminals, the client 20 of the electronic whiteboard 2a communicates with the client 20 of each of the electronic whiteboards 2b and 2c, via the server 90 in the electronic whiteboard 2a. The client 20 of each of the electronic whiteboards 2b and 2c communicates with the client 20 of each of the electronic whiteboards 2a and 2c, and the client 20 of each of the electronic whiteboards 2a and 2b, respectively, via the server 90 in the electronic whiteboard 2a.

<Functional Configuration of Client 20>

The client 20 starts operation in response to activation of the first communication application A11 in the electronic whiteboard 2. The client 20 includes a communication controller (communication control unit) 21 and a drawing controller (drawing control unit) 22.

The communication controller 21, which may be implemented by instructions of the CPU 201 or with the network I/F 205, controls communication with the other electronic whiteboards 2 and with the server 90 of the same electronic whiteboard 2.

The drawing controller 22, which may be implemented by the instructions of the CPU 201, performs image processing on stroke data that is generated according to user operation on the display 3, and various types of data obtained from any desired device including, without limitation, the USB memory 5, the note PC 6, the communication controller 21, and the memory 2000. The drawing controller 22 generates a plurality of image layers based on the processed data, and outputs a combined image in which the plurality of image layers are superimposed one atop the other.

Figure 7:
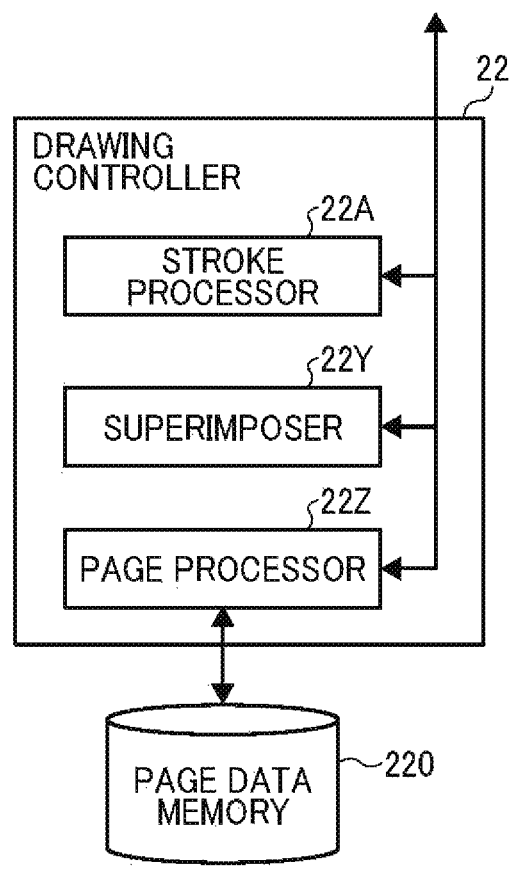
FIG. 7 is a schematic block diagram illustrating a functional configuration of a drawing controller according to one of the embodiments.

FIG. 7 is an illustration of a functional configuration of the drawing controller 22 according to the example embodiment. The drawing controller 22 includes a stroke processor (stroke processing unit) 22A, a superimposer (combining unit) 22Y, and a page processor (page processing unit) 22Z.

The stroke processor 22A, which may be implemented by the instructions of the CPU 201, generates the stroke data that reflects a drawing drawn on the display 3 by the user with the electronic pen 4 or the user's hand H.

The superimposer 22Y, which may be implemented by the instructions of the CPU 201, generates each image layer based on data, which is the stroke data or one of the various types of data, and superimposes the plurality of image layers one atop the other.

The page processor 22Z, which may be implemented by the instructions of the CPU 201, generates one or more pieces of page data by combining various data items, such as the stroke data, in one page for display, and stores each of the one or more pieces of page data in a page data memory (page data memory unit) 220 of the memory 2000. Hereinafter, the one or more pieces of page data may be collectively referred to as page data.

The page data memory 220 is a memory area in the memory 2000 to store the page data as illustrated in Table 1. Table 1 illustrates an example data structure of the page data. The page data includes stroke arrangement data and medium data in which each piece of page data that corresponds to one page displayed on the display 3 has a corresponding piece of stroke arrangement data and a corresponding piece of medium data. Each piece of stroke arrangement data includes one or more pieces of stroke data. Hereinafter, the one or more pieces of stroke arrangement data, the one or more pieces of medium data, and one or more pieces of stroke data may be collectively referred to as stroke arrangement data, medium data, and stroked data, respectively.

TABLE 1

| PAGE DATA ID | START TIME | END TIME | STROKE ARRANGEMENT DATA ID | MEDIUM DATA ID |
|---|---|---|---|---|
| p001 | 20150522152034 | 20150522152402 | st001 | m001 |
| p002 | 20150522152415 | 2015522152825 | st002 | m002 |
| p003 | 20150522153345 | 20150522154033 | st003 | m003 |
| ... | ... | ... | ... | ... |

Each piece of page data includes various data items that are associated with each other. The various data items include such as a page data ID for identifying a corresponding page, a start time indicating when display of the corresponding page is started, an end time indicating when drawing to the corresponding page by stroke or gesture is ended, a stroke arrangement data ID for identifying the corresponding piece of stroke arrangement data generated by stroke using the electronic pen 4 or the user's hand H, and a corresponding piece of medium data ID for identifying the corresponding piece of medium data. The stroke arrangement data is to be used for displaying a stroke image on the display 3. The medium data is to be used for displaying the other images than the stroke image on the display 3, together with the stroke image.

The stroke arrangement data includes various types of information (data items) as illustrated in Table 2 (FIG. 20A). Table 2 illustrates an example data structure of the stroke arrangement data. As illustrated in FIG. 2, each piece of stroke arrangement data includes the one or more pieces of stroke data, each of which corresponds to a single image of stroke drawn by a single movement of stroke. Each piece of stroke data includes a stroke data ID for identifying data thereof, a start time indicating when the corresponding stroke starts, an end time indicating when the corresponding stroke ends, a color of the corresponding stroke, a width of the corresponding stroke, and a coordinate arrangement data ID for identifying an arrangement of points, or coordinates, of the corresponding stroke, which is a piece of coordinate arrangement data. For example, when the user draws the alphabet "S" with the electronic pen 4 in one stroke, one stroke data ID is assigned to the alphabet "S" to be identified. When the user draws the alphabet "T" with the electronic pen 4 in two strokes, two stroke data IDs are assigned to the alphabet "T" to be identified.

Each piece of coordinate arrangement data includes various types of information as illustrated in Table 3 (FIG. 20B). The one or more pieces of coordinate arrangement data may be collectively referred to as coordinate arrangement data. Table 3 illustrates an example data structure of the coordinate arrangement data. The coordinate arrangement data includes data items such as s a point (X coordinate value, Y coordinate value) on the display 3, a difference time (ms) indicating a difference between a start time when a corresponding stroke starts and a time when the stroke passes on the point, and pressure on the point caused by the electronic pen 4. That is, one of the coordinate arrangement data ID illustrated in Table 2 corresponds to a collection of points in corresponding one piece of the coordinate arrangement data as illustrated in Table 3. For example, when the user draws the alphabet "S" with the electronic pen 4 in one stroke, a plurality of points will be touched with the electronic pen 4, such that the coordinate arrangement data indicates information on the plurality of points of the stroke drawing.

The medium data of the page data in Table 1 includes various information as illustrated in Table 4. Table 4 illustrates an example data structure of the medium data. As illustrated in Table. 4, each piece of medium data includes a medium data ID for identifying media data thereof and managed in Table 1, a type of the media data, a recording time when the medium data is recorded, a position (X coordinate, Y coordinate) of an image to be displayed on the display 3 based on the medium data, a size of the image (width, height), and data indicating content of the medium data. The position of the image to be displayed based on the medium data indicates the upper left corner of that image, when the X and Y coordinates of the upper left corner of the display 3 are set to (0, 0).

TABLE 4

| MEDIUM DATA ID | DATA TYPE | RECORDING TIME | X | Y | WIDTH | HEIGHT | DATA |
|---|---|---|---|---|---|---|---|
| m001 | IMAGE | 20150522152632 | 0 | 0 | 1920 | 1080 | abc.jpg |
| m002 | IMAGE | 20150522153002 | 277 | 156 | 1366 | 768 | bcd.jpg |
| m003 | IMAGE | 20150522154217 | 277 | 156 | 1366 | 768 | cde.jpg |
| ... | ... | ... | ... | ... | ... | ... | ... |

<Functional Configuration of Server 90>

The server 90 includes a communication controller (communication control unit) 91.

The communication controller 91, which may be implemented by the instructions of the CPU 201, internally communicates with the communication controller 21 of the client 20 in the same electronic whiteboard 2 and communicates with the other communication controllers 21 of the clients 20 in the other electronic whiteboards 2 through the first communication network 9a.

<Functional Configuration of Client 80>

Clients 80, each of which is in one of the electronic whiteboard 2c and the PC 8 of FIG. 6, start operation in response to activation of the second communication applications B11 in corresponding one of the electronic whiteboard 2c and the PC 8. Each client 80 includes a communication controller (communication control unit) 81, a display controller (display control unit) 82, and an input device (input operation receiving unit) 83.

Each communication controller 81, which may be implemented by the instructions of corresponding one of the CPUs 201 and 801, or corresponding one of the network I/F 205 and the network I/F 811, communicates with the other communication terminals.

Each display controller 82, which may be implemented by the instructions of corresponding one of the CPUs 201 and 801, performs image processing based on data obtained from, for example, corresponding one of the memories 2000 and 8000, and outputs image data representing an image to be displayed.

Each input device 83, which may be implemented by the instructions of corresponding one of the CPUs 201 and 801, receives an input operation by the user.

<Functional Configuration of Management System 50>

The management system 50 includes the hardware of FIG. 3, which operates in cooperation with the control program, to implement the functional configuration of FIG. 6A. The management system 50 further includes a communication controller (communication control unit) 51 and a memory 5000, which may be implemented with the HD 504.

The communication controller 51 of the management system 50, which may be implemented by the instructions of the CPU 501, communicates with the electronic whiteboard 2 and the PC 8 through the second communication network 9b.

<Functional Configuration of Electronic Whiteboard 2c>

The electronic whiteboard 2c further includes an application I/F (application I/F unit) 23, a display order controller (display order control unit) 24, and a mode switching device (mode switching unit) 25.

The application I/F 23 starts operation in response to activation of the I/F application C11 in the electronic whiteboard 2c. The application I/F 23, which may be implemented by the instructions of the CPU 201, outputs a predetermined UI image to the clients 20 and 80.

The display order controller 24 starts operation in response to activation of the OS 2020 in the electronic whiteboard 2c. The display order controller 24, which may be implemented by the instructions of the CPU 201, controls a display order of images in a manner that a display image generated by one of the clients 20 and 80 is activated while a display image generated by the other one of the clients 20 and 80 is deactivated. The display image is activated when it is displayed on a top layer of all of the display images. Any display image placed on layers under the top layer is deactivated.

The mode switching device 25 starts operation in response to the activation of the OS 2020 in the electronic whiteboard 2c. The mode switching device 25, which may be implemented by the instructions of the CPU 201, switches an operating mode in the OS 2020. Switching the operating mode includes switching between a normal operating mode and a sleep mode. When switching from the normal operating mode to the sleep mode, the mode switching device 25 sends a request to each application that is activated for transition to a standby mode.

«Processing According to Embodiment»

Now, a description of processing according to the example embodiment is given below.

(Establishing Communication Among Electronic Whiteboards)

Figure 8:
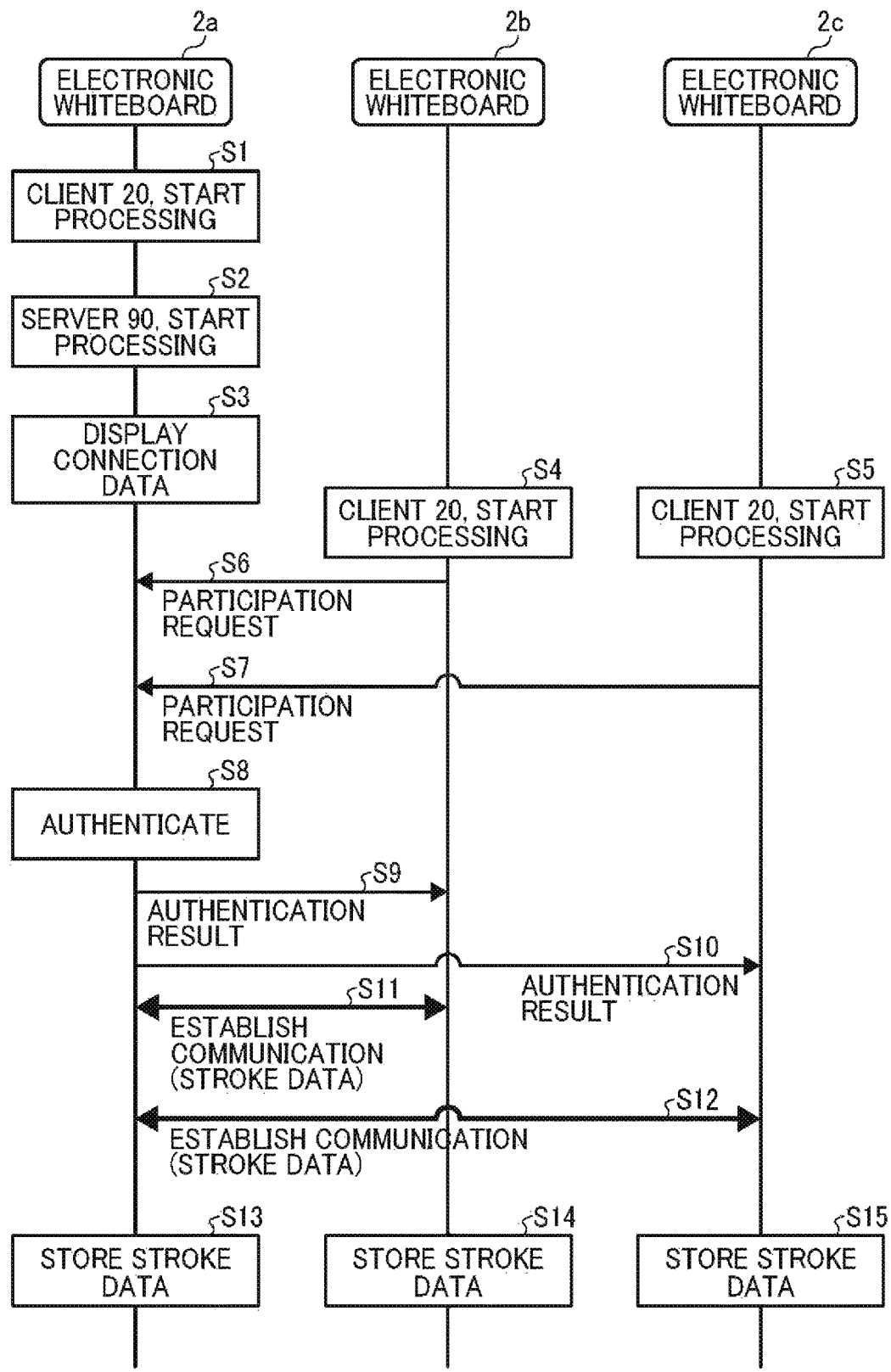
FIG. 8 is a sequence diagram illustrating interactions among a plurality of electronic whiteboards in establishing communication.

Referring to FIG. 8, establishing communication among the electronic whiteboards 2a, 2b, and 2c, is described according to an embodiment. FIG. 8 is a sequence diagram illustrating interactions among the electronic whiteboards 2a, 2b, and 2c in establishing the communication. As the power switch 226 of the electronic whiteboard 2a is turned on by the user, the first communication application A11 is activated to start processing of the client of the electronic whiteboard 2a (S1). In response to receiving a request for starting a videoconference by user operation on the display 3a, the communication controller 21 of the client 20 transmits an instruction to start processing of the server 90 to the communication controller 91 of the server 90 in the same electronic whiteboard 2a. Accordingly, the electronic whiteboard 2a starts various processing by the server 90, in addition to processing by the client 20 (S2).

The communication controller 91 of the electronic whiteboard 2a generates connection data to be used for establishing connection with the electronic whiteboard 2a and causes the display 3a to display the generated connection data (S3). The connection data includes an Internet Protocol (IP) address of the host terminal, and a pass code that is generated for the communication session to be established for image sharing. The IP address of the host terminal is previously stored in a local memory of the electronic whiteboard 2a such as the memory 2000. The pass code, which is newly generated, is stored in the memory 2000. The user at the electronic whiteboard 2a, who now knows the connection data, informs the other users at the electronic whiteboards 2b and 2c of the connection data through a telephone or an electronic mail.

Similarly, when the user at the electronic whiteboard 2b turns on the power switch 226, the first communication application A11 is activated to start processing of the client 20 in the electronic whiteboard 2b (S4). Similarly, when the user at the electronic whiteboard 2c turns on the power switch 226, the first communication application A11 is activated to start processing of the client 20 in the electronic whiteboard 2c (S5). In response to a user input of the connection data that is informed to the display 3b, the communication controller 21 of the client 20 in the electronic whiteboard 2b transmits a participation request, with the pass code obtained from the input connection data, to the communication controller 91 of the server 90 in the electronic whiteboard 2a through the first communication network 9a using the Internet Protocol (IP) address of the host terminal obtained from the connection data (S6). Similarly, in response to a user input of the connection data that is informed to the display 3c, the communication controller 21 of the client 20 in the electronic whiteboard 2c transmits a participation request, with the pass code obtained from the input connection data, to the electronic whiteboard 2a through the first communication network 9a using the IP address of the host terminal obtained from the connection data (S7). The communication controller 91 of the electronic whiteboard 2a receives the participation request (with the pass code), from each of the electronic whiteboards 2b and 2c.

Next, the communication controller 91 authenticates the electronic whiteboards 2b and 2c, based on a match between each of the pass codes that are received from the electronic whiteboards 2b and 2c, and the pass code stored in the memory 2000 (S8). The communication controller 91 transmits an authentication result to each of the clients 20 of the electronic whiteboards 2b and 2c (S9 and S10). When each authentication result indicates that the corresponding one of the electronic whiteboards 2b and 2c is authenticated, communication among the electronic whiteboard 2a, which operates as the host terminal, and the electronic whiteboard 2b and electronic whiteboard 2c, which operate as participant terminals, is established (S11 and S12). In the following, it is assumed that content data transmitted among the electronic whiteboards 2a, 2b, and 2c include stroke data.

When any one of the users at the electronic whiteboards 2a, 2b, and 2c (referred to as the "one electronic whiteboard 2") draws a stroke image with a corresponding one of the electronic pens 4a, 4b, and 4, the stroke processor 22A of the one electronic whiteboard 2 generates stroke data based on coordinates indicating a contact portion on the display 3 with the electronic pen 4. Subsequently, the communication controller 21 of the one electronic whiteboard 2 transmits the generated stroke data to the communication controller 91 of the electronic whiteboard 2a, which is the host terminal.

When receiving the stroke data from the communication controller 91 of the one electronic whiteboard 2, the communication controller 91 of the electronic whiteboard 2a transmits the received stroke data to the clients 20 of the other ones of the electronic whiteboards 2a, 2b, and 2c other than the one electronic whiteboard 2 (referred to as the "other electronic whiteboards 2"). The communication controllers 21 of the clients 20 of the other electronic whiteboards 2 receive the transmitted stroke data. The page processors 22Z of the other electronic whiteboard 2 store the stroke data in the page data memories 220, as newly obtained stroke data to be added to previous stored stroke data (S13, S14, and S15). Through this, the page data memory 220 of each one of the electronic whiteboards 2a, 2b, and 2c stores the stroke data generated with any one of the electronic whiteboards 2a, 2b, and 2c while the communication among the electronic whiteboards 2a, 2b, and 2c is being established.

(Establishing Communication Between Electronic Whiteboard 2c and PC 8)

Figure 9:
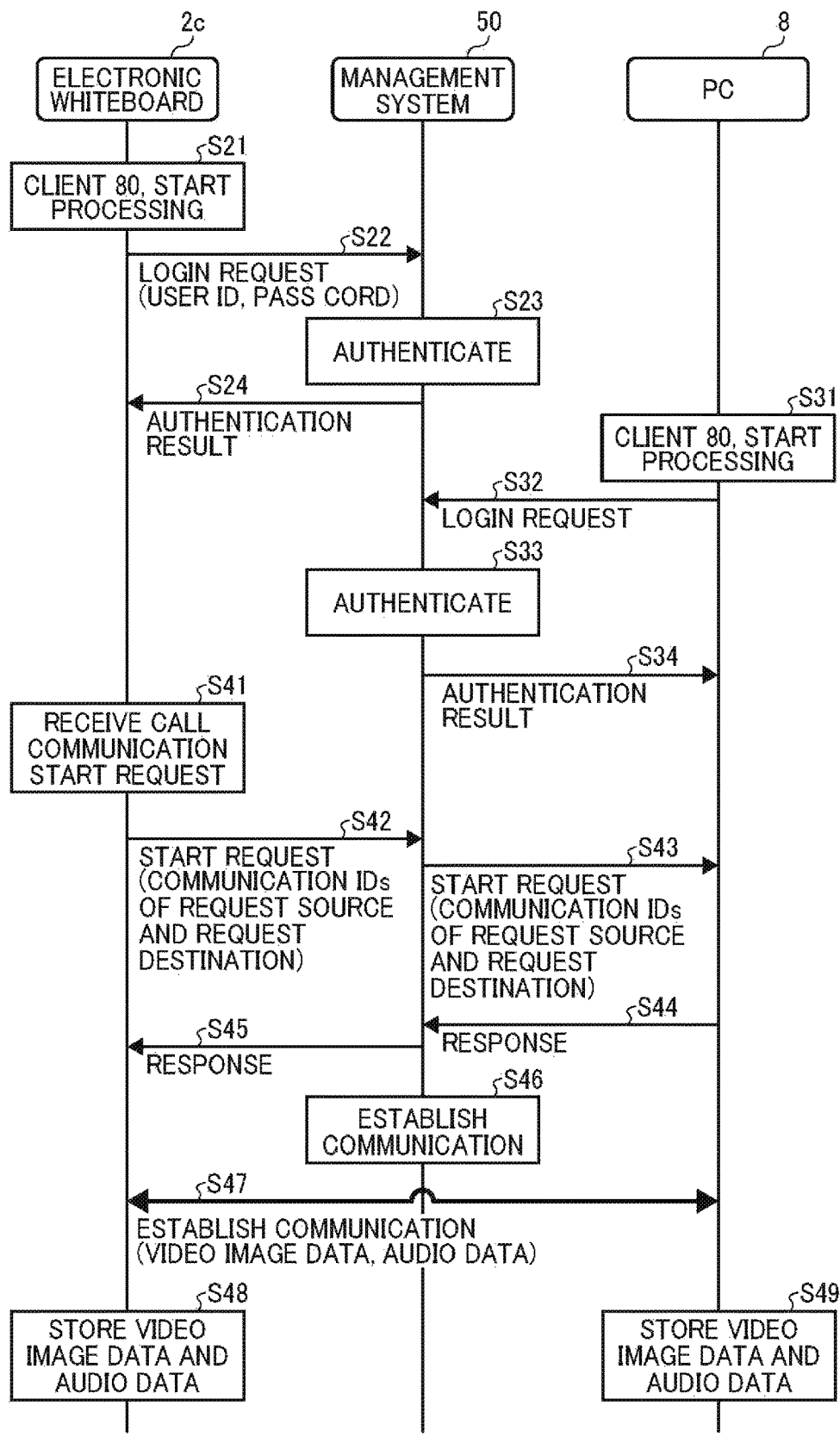
FIG. 9 is a sequence diagram illustrating, interactions among the electronic whiteboard, the management system and the PC in establishing communication between the electronic whiteboard and the PC.

Referring to FIG. 9, operation of establishing communication between the electronic whiteboard 2c and the PC 8, via the management system 5, is described according to the example embodiment. FIG. 9 is a sequence diagram illustrating interactions among the electronic whiteboard 2c, the management system 50, and the PC 8 in establishing communication between the electronic whiteboard 2c and the PC 8.

In response to a user input of a request for activating the second communication application B11 (activation request) to the display 3c, the client 80 of the electronic whiteboard 2c is activated to able to start processing (S21).

The communication controller 81 of the client 80 transmits a login request to the management system 50 (S22). The login request includes a user ID of the user operating the electronic whiteboard 2c and the pass cord used for establishing the communication. The communication controller 51 of the management system 50 receives the login request.

The management system 50 authenticates the electronic whiteboard 2c (the user) by determining whether a pair of the user ID and a pass cord in the login request matches any pair of the user ID and the pass cord previously stored in the memory 5000 (S23). The communication controller 51 of the management system 50 transmits an authentication result to the electronic whiteboard 2c (S24). The communication controller 81 of the electronic whiteboard 2c receives the authentication result. In the following, it is assumed that the authentication result indicates that the electronic whiteboard 2c (the user) that sends the login request from the electronic whiteboard 2c is authenticated.

When the PC 8 receives an activation request with a user input via the keyboard 821 or the mouse 822, the second communication application B11 is activated and processing of the client 80 is started in the PC 8 (S31).

Subsequently, the communication controller 81 of the PC 8 transmits a login request to the management system 50 (S32). The login request may include a user ID of the user operating the PC 8 and a password, for example. The management system 50 receives the login request.

The management system 50 authenticates the PC 8 that sends the login request (S33) and transmits an authentication result to the PC 8 (S34). In the following, it is assumed that the authentication result indicates that the login request from the PC 8 is authenticated.

The input device 83 of the electronic whiteboard 2c receives a request to start communication with the PC 8 (communication request) with a user operation with the electronic whiteboard 2c (S41). In response to receiving the communication start request, the communication controller 81 of the electronic whiteboard 2c transmits the call communication start request to the management system 50 (S42). The communication start request includes the user ID, which is used in logging into the management system 50 by the electronic whiteboard 2c as a request source, and the user ID of the user operating the PC 8 as a request destination. The management system 50 receives the communication start request.

The management system 50 transmits the communication start request to the request destination, the PC 8 (S43). The PC 8, which is the request destination, receives the call communication start request.

The communication controller 81 of the PC 8 transmits, to the management system 50, a response indicating whether the PC 8 is able to accept the request to start the call communication with the electronic whiteboard 2c, according to an user input in response to the call communication request (S44). In the following, it is assumed that the PC 8 transmits the response indicating that the PC 8 accepts the call communication start request, to the management system 50.

The communication controller 51 of the management system 50 receives the response indicating that the PC 8 accepts the call communication start request. The communication controller 51 of the management system 50 transfers, to the electronic whiteboard 2c as the request source, information indicating contents of the response mentioned above (S45). The communication controller 81 of the electronic whiteboard 2c receives the information indicating the contents of the response, which indicates acceptance of the call communication start request.

Subsequently, the management system 50 establishes communication between the electronic whiteboard 2c and the PC 8, through the second communication network 9b, for transmission and reception of content data (S46). For example, the management system 50 authorizes the electronic whiteboard 2c and the PC 8 to access a specific access destination to be used for accessing the content data. The access destination may be a storage area in the management system 50 or a storage area of other device external to the management system 50. When the communication between the electronic whiteboard 2c and the PC is established, each of the electronic whiteboard 2c and the PC 8 accesses the access destination, and sends video image data generated based on a video image captured with a corresponding one of the cameras 207 and 812 and audio data generated based on sounds picked up with a corresponding one of the microphones 222 and 814 while acquiring video image data and audio data from the access destination (S47). The video image data and the audio data is streaming data that includes a plurality of pieces of image data and audio data, that is, a plurality of still images (signals) each captured at a different time or audio (signals) each picked up at a different time.

When receiving new pieces of image data and audio data, the communication controller 81 of the electronic whiteboard 2c updates pieces of image data and audio data previously stored in the memory 2000 with the new pieces of image data and audio data (S48 and S49). Through this, the latest pieces of image data and audio data are stored in the memory 2000.

<Generating Image with First Communication Application A11>

Figure 10A:
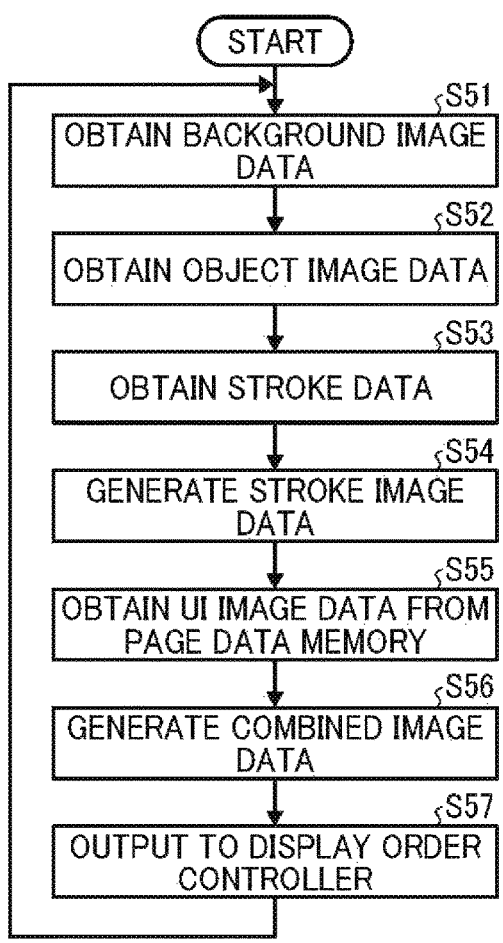
FIG. 10A and FIG. 10B are flowcharts each illustrating a process of generating an image.

In the following, generating an image based on the stroke data transmitted among the electronic whiteboards 2a, 2b, and 2c is described with reference to FIG. 10A. FIG. 10A is a flowchart illustrating a process of generating an image with the first communication application A11. Generating the image with the first communication application A11 of the electronic whiteboard 2c is described below.

The page data memory 220 stores, for example, a background image data (media data) obtained from the USB memory 5. The page processor 22Z of the electronic whiteboard 2c acquires the background image data stored in the page data memory 220 (S51).

The page data memory 220 stores object image data (media data) in advance. The page processor 22Z of the electronic whiteboard 2c acquires the object image data stored in the page data memory 220 (S52). Here, an object image includes, for example, an image of a round, square, and triangular shaped object, which is determined in advance.

The page processor 22Z of the electronic whiteboard 2c acquires the stroke data stored in the page data memory 220 (See S15) (S53).

The page processor 22Z of the electronic whiteboard 2c generates image data of the stroke image based on the stroke data acquired in S53 (S54). For example, when stroke data indicating the alphabet "S" is acquired in S53, the page processor 22Z generates image data of an image of "S".

The page data memory 220 of the electronic whiteboard 2c stores image data of UI images (UI image data). The UI images include, for example, an icon and a button. The page processor 22Z of the electronic whiteboard 2c acquires the UI image data from the page data memory 220 (S55). The UI image data includes icon image data corresponding to an icon indicating a communication state of the client 80, an icon I1 for receiving an instruction for ending a videoconference, an icon I2 for receiving an instruction switching to a videoconference screen, and an icon I3 for receiving an instruction for switching to an electronic whiteboard screen. Instead of causing the electronic whiteboard 2 to switch to the videoconference screen, the icon I2 may be a UI image, which, when selected, to display the videoconference screen side by side to the electronic whiteboard screen at the same time. Instead of causing the electronic whiteboard to switch to the electronic whiteboard screen, the icon I3 may be a UI image, which, when selected, to display the electronic whiteboard screen side by side to the videoconference screen at the same time. Additionally, the UI image data stored in the page data memory 220 includes a plurality of icons each indicating a specific communication state. Acquisition of the image data with the page processor 22Z is controlled by the application I/F 23. This processing is deferred. The page data memory 220 manages a display position of each of icons I1, I2, and I3, which is changeable by drag and drop operation of the user. As described above, when an area where the stroke is to be drawn or an image area to be checked is overlapped with one or more of the icons I1, I2, and I3, the display positions of the one or more of the icons I1, I2, and I3 can be moved, resulting in improvement in operability and visibility.

The superimposer 22Y of the electronic whiteboard 2c generates image data of combined image (combined image data) in which a background image, an object image, a stroke image, and a UI image, which are obtained or generated in one or more of S51, S52, S54, and S55, are superimposed in order (S56).

Figure 11A:
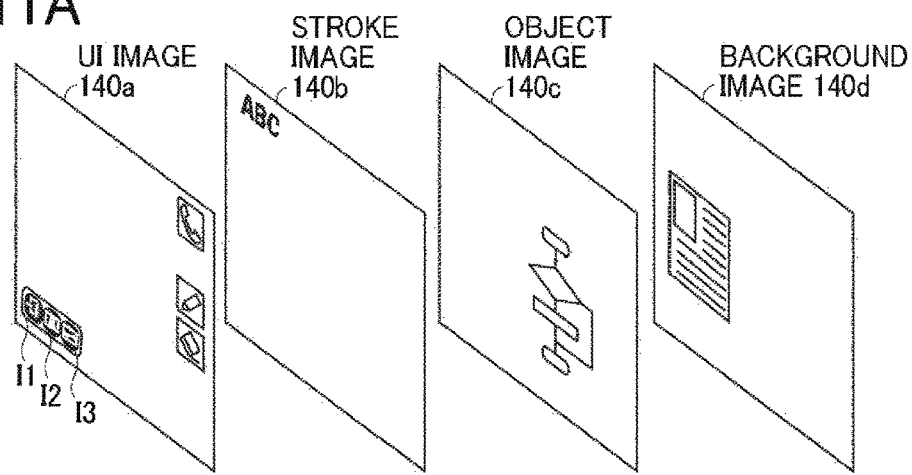
FIG. 11A, FIG. 11B, and FIG. 11C are illustrations of combined images.
Figure 11B:
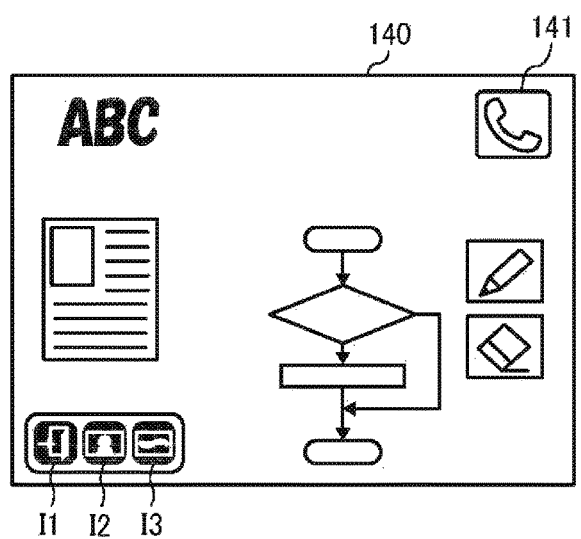

The superimposer 22Y outputs the combined image data generated in S56 to the display order controller 24 (S57). FIG. 11A is a diagram illustrating images 140a to 140d to be superimposed. FIG. 11B is a diagram illustrating a combined image 140. As illustrated in FIG. 11A and FIG. 11B, the combined image 140 output in S57 includes a UI image 140a, a stroke image 140b, an object image 140c, and a background image 140d.

During the activation of the first communication application A11, the electronic whiteboard 2c repeats the processing from S51 to S57. Through this, the latest combined image reflecting the latest background image, object image, stroke image, UI image is output repeatedly to the display order controller 24.

In the repeated processing, the client 20 may skip S51 or S53 and S54 when there is no update in the background image data or the stroke data stored in the page data memory 220. In the repeated processing, the client 20 may skip S52 and S55 when there is no update in the object image data or the UI image data, each of which is to be obtained. In this case, the image data previously obtained or generated is used in generating the combined image.

(Generating Image with Second Communication Application B11)

Figure 10B:
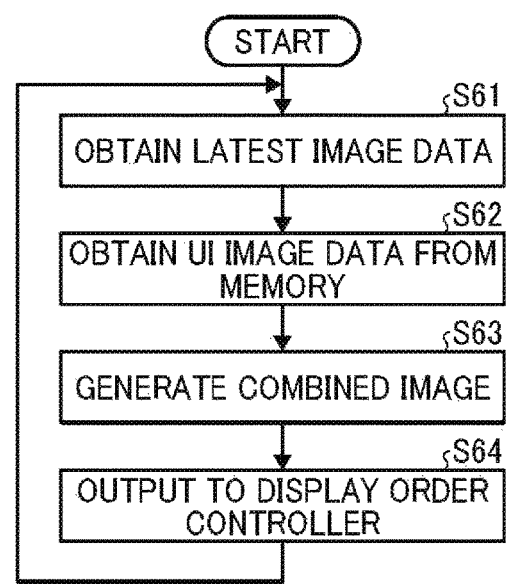

Subsequently, generating an image based on video image data transferred between the electronic whiteboard 2c and the PC 8 is described with reference to FIG. 10B. FIG. 10B is a flowchart illustrating a process of generating an image with the second communication application B11. Generating the image with the second communication application B11 of the electronic whiteboard 2c is described below.

The display controller 82 of the electronic whiteboard 2c of the display controller 82 obtains image data (See S48) of the latest image stored in the memory 2000 (S61). The latest image data is data that builds the video image data received in S47, and that is overwritten in S48.

The memory 2000 of the electronic whiteboard 2c stores UI image data corresponding to UI images. The UI images include, for example, an icon and a button. The UI image may be a message such as "Receiving request to add a destination to the list" according to an event. The display controller 82 of the electronic whiteboard 2c acquires the UI image data stored in the page data memory 220 (S62). The UI image data includes icon image data corresponding to an icon indicating a communication state of the client 20, an icon I1 for ending a videoconference, an icon I2 for transitioning to a videoconference screen, and an icon I3 for transitioning to an electronic whiteboard screen. The UI image data stored in the page data memory 220 includes a plurality of icons each indicating a communication state. Acquisition of the image data with the display controller 82 is controlled by the application I/F 23. This processing is deferred.

The display controller 82 of the electronic whiteboard 2c generates combined image data in which the latest image and UI image are superimposed in order, using the image data obtained in S61 and S62 (S63).

Figure 12A:
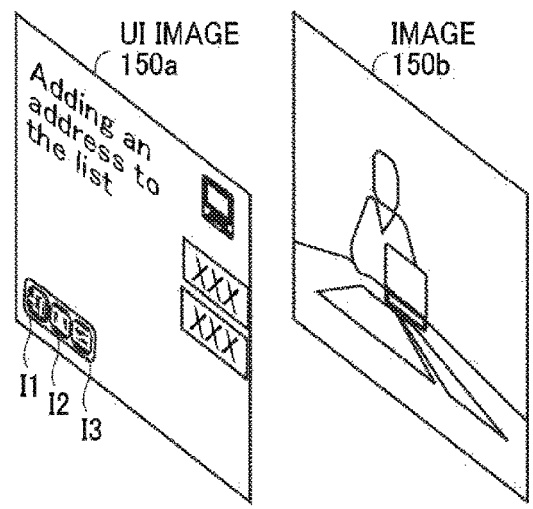
FIG. 12A, FIG. 12B, and FIG. 12C are illustrations of combined images.
Figure 12B:
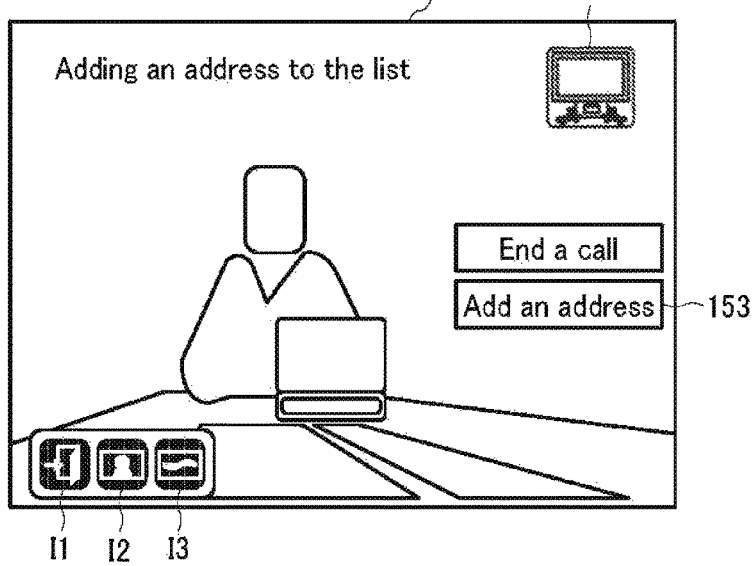

The display controller 82 of the electronic whiteboard 2c outputs the combined image data generated in S63 to the display order controller 24 (S64). FIG. 12A is a diagram illustrating images 150a and 150b to be superimposed to generate a combined image 150 of FIG. 12B. FIG. 12B is a diagram illustrating the combined image 150. As illustrated in FIGS. 12A and 12B, the combined image 150 output in S64 includes a UI image 150a and a latest image 150b that corresponds to a video image.

The client 80 of the electronic whiteboard 2c repeats the processing from S61 to S64 while the second communication application B11 is activated. Through this, the combined image reflecting the latest image that builds the video image and the UI image is output repeatedly to the display order controller 24.

In the repeated processing, the client 80 may skip S62 when there is no change in the UI image data, which is to be obtained. In this case, the image data previously acquired is used in generating a combined image.

(Controlling Display Order)

Figure 13:
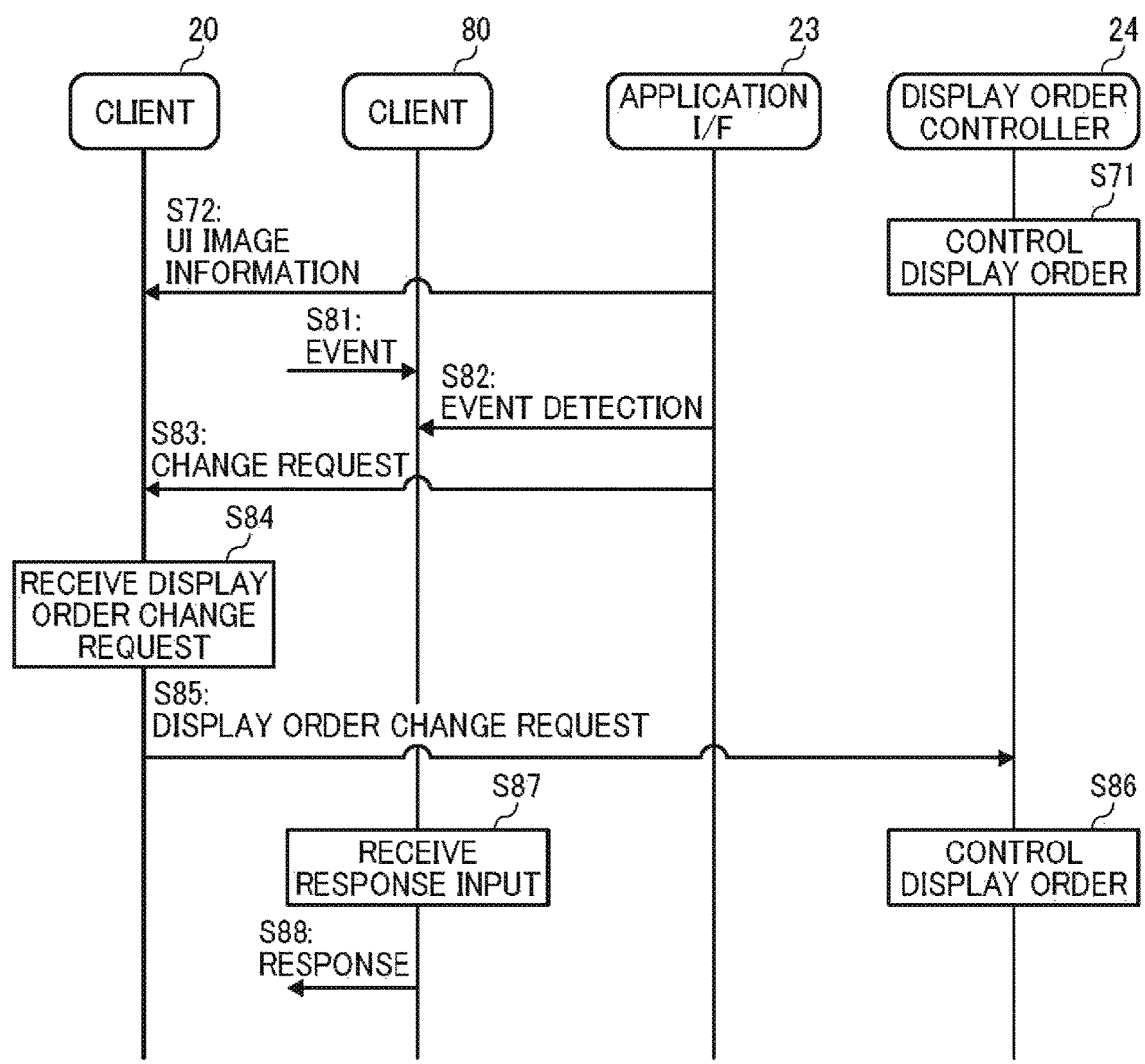
FIG. 13 is a sequence diagram illustrating interactions among components in the electronic whiteboard in controlling a display order of images, according to the one of the embodiments.

Referring to FIG. 13, operation performed by the display order controller 24 of the electronic whiteboard 2c to control a display order of a display image output from the client 20 and a display image output from the client 80 is described.

FIG. 13 is a sequence diagram illustrating operation of controlling the display order of images. FIG. 13 illustrates interactions among components in the electronic whiteboard 2c.

When a latter one of the communication applications A11 and B11 is activated, the display order controller 24 outputs an image signal to the display 3c for displaying an image in a manner that the image data output from the client 20 (See S57) is made active and the image data output from the client 80 (See S64) is made inactive, and this processing is default (S71). The display order is controlled by, for example, superimposing a display area of a window corresponding to the second communication application B11 on a display area of a window corresponding to the first communication application A11, with the OS 2020. When the display image output from the client 20 is an image of the entire screen, display of the display 3c is occupied by the display image output from the client 20.

The page data memory 220 stores the UI image data corresponding to a predetermined brightness icon (first communication icon) to be displayed with a predetermined brightness value, and a semi-brightness icon (second communication icon) to be displayed with half a value of the predetermined brightness value, as UT images for indicating a state of the electronic whiteboard 2 in relation to the second communication application B11. The first communication icon is made selectable by the user, and the second communication icon is made unelectable by the user. The first communication icon indicates a state in which a predetermined event occurs in the second communication application B11. The second communication icon indicates a state in which the predetermined event does not occur in the second communication application B11. When a latter one of the communication applications A11 and B11 is activated, the application I/F 23 sends UI image information on the second communication icon, which is one of the UI images indicating a state in association with the second communication application B11, and this processing is default (S72).

When the communication controller 21 of the client 20 receives the UI image information indicating the image data of the second communication icon, the page processor 22Z obtains the image data of the second communication icon in S55. Through this, the combined image output to the display order controller 24 in S57 includes the second communication icon I41 as illustrated in FIG. 11B. The user, accordingly, can visually recognize the second communication icon I41 even when the image output from the client 20 is made activate and know that no predetermined event is happening in the second communication application B11.

The application I/F 23 detects the predetermined event that triggers change in the state of the second communication application B11. Examples of such a predetermined event include an event of receiving an input, which triggers change of the state of the second communication application B11, from the user. More specifically, such an event includes receiving a call communication request with the PC 8, receiving a request for adding the user of the electronic whiteboard 2c to the destination list (destination list addition request) in the PC 8, or the like. A description of when the event is receiving the destination list addition request is given below.

The communication controller 81 of the electronic whiteboard 2c receives the list addition request, which is for adding a destination to a destination request sent from the PC 8, in which receiving the list addition request is an event (S81).

The application I/F 23 of the electronic whiteboard 2c detects a reception of the destination list addition request, which is one of the predetermined events (S82). There is no specific limit to a method for detecting such a predetermined event with the application I/F 23. For example, the application I/F 23 may send information used to check whether the predetermined event is received, to the communication controller 81 at predetermined intervals, for example, each 30 minutes. In this case, the application I/F 23 can detect the event based on a response received from the communication controller 81 in relation to the information. Alternatively, the communication controller 81 may send information indicating a reception of the event to the application I/F 23 when receiving the predetermined event. In this case, the application I/F 23 detects the event based on the information sent from the communication controller 81.

The application I/F 23 of the electronic whiteboard 2c manages the UI images each of which corresponds to one of the predetermined events. A description in which the application I/F 23 manages information indicating the first communication icon as a UI image corresponding to the reception of the destination list addition request is given below. In response to detecting the reception of the destination list addition request, the application I/F 23 transmits, to the client 20, a request to change a display image (change request) to display the first communication icon corresponding to this event (S83). The change request is a request to change the UI image to an image indicated with information included in the change request. As described above, when detecting such an event occurring in one of the communication applications A11 and B11, the application I/F 23 sends the change request to the other one of the communication applications B11 and A11.

Figure 11C:
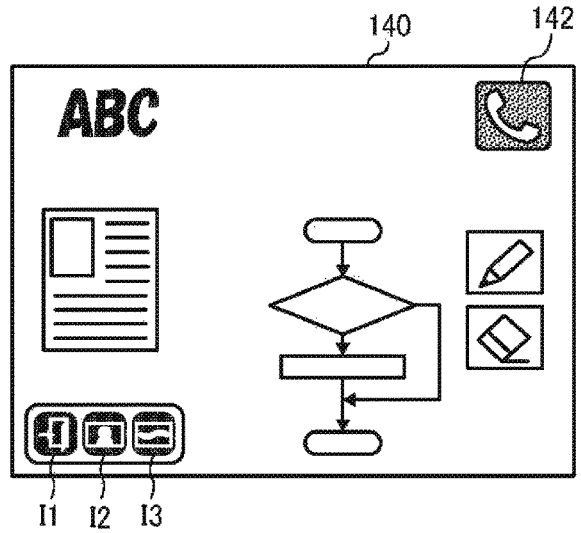

The communication controller 21 of the electronic whiteboard 2c receives the change request sent from the application I/F 23. The page processor 22Z of the electronic whiteboard 2c obtains the UI image data corresponding to the first communication icon from the page data memory 220 according to the information in the change request in S55. Through this, the image of the first communication icon is output as a UI image in S57. FIG. 11C is an illustration of the combined image 140 after being changed according to the received information in relation to the change request. As illustrated in FIG. 11C, the combined image 140 output in S57 after receiving the change request includes a first communication icon I42. The user, accordingly, can visually recognize the first communication icon I42 even when the image output from the client 20 is made active and know that the predetermined event is happening in the second communication application B11.

When the user of the electronic whiteboard 2c touches a position where the icon I42 is displayed on the display 3c, the drawing controller 22 receives an input indicating a request for changing a display order of images displayed with the display 3c (display order change request) (S84).

In response to receiving the input indicating the display order change request, the communication controller 21 of the electronic whiteboard 2c transmits information in relation to the display order change request, which is for changing the display order of images displayed with the display 3c, to the display order controller 24 (S85).

The display order controller 24 of the electronic whiteboard 2c receives the display order change request. In response to receiving the displaying order change request, the display order controller 24 deactivates the image output from the client 20 that is a request source and, activates the image output from the client 80 (S86). Through this, an image due to the second communication application B11 as illustrated in FIG. 12B, is output from the display 3c. Additionally, the display order controller 24 may display the images output from both clients 20 and 80 at the same time in a manner that a size of the image output form the client 20 is smaller than that of the image output from the client 80.

When the user of the electronic whiteboard 2c touches a position where a button 153 is displayed on the display 3c, the input device 83 receives an input of a response indicating accepting the destination list addition request sent from the PC 8 (S87).

In response to receiving the input of the response of approval for the request, the communication controller 81 of the electronic whiteboard 2c transmits the response of approval for the request to the PC 8, which is a request source (S88).

(Ending Videoconference)

Figure 17A:
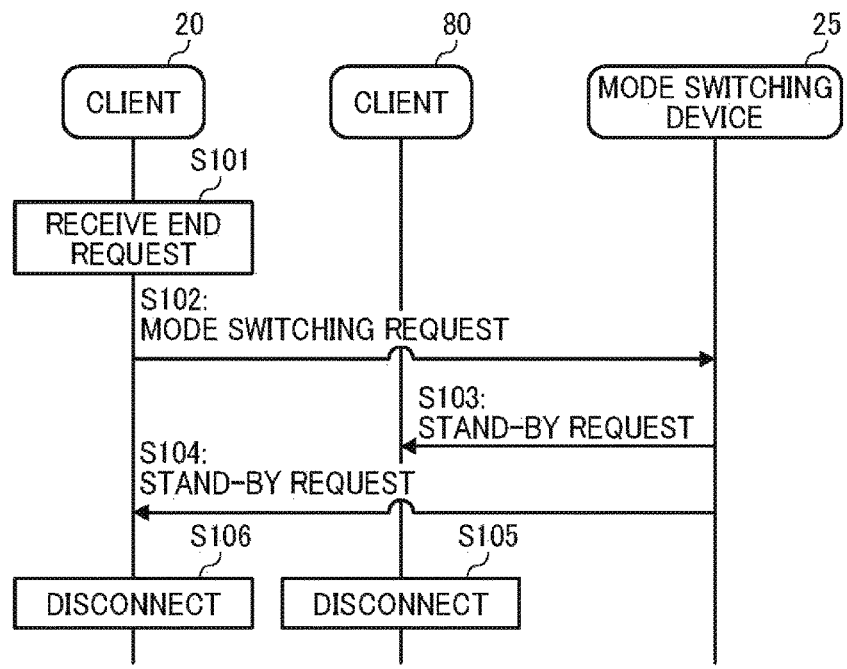
FIG. 17A and FIG. 17B are sequence diagrams each illustrating interactions among the components in the electronic whiteboard in ending videoconference.
Figure 17B:
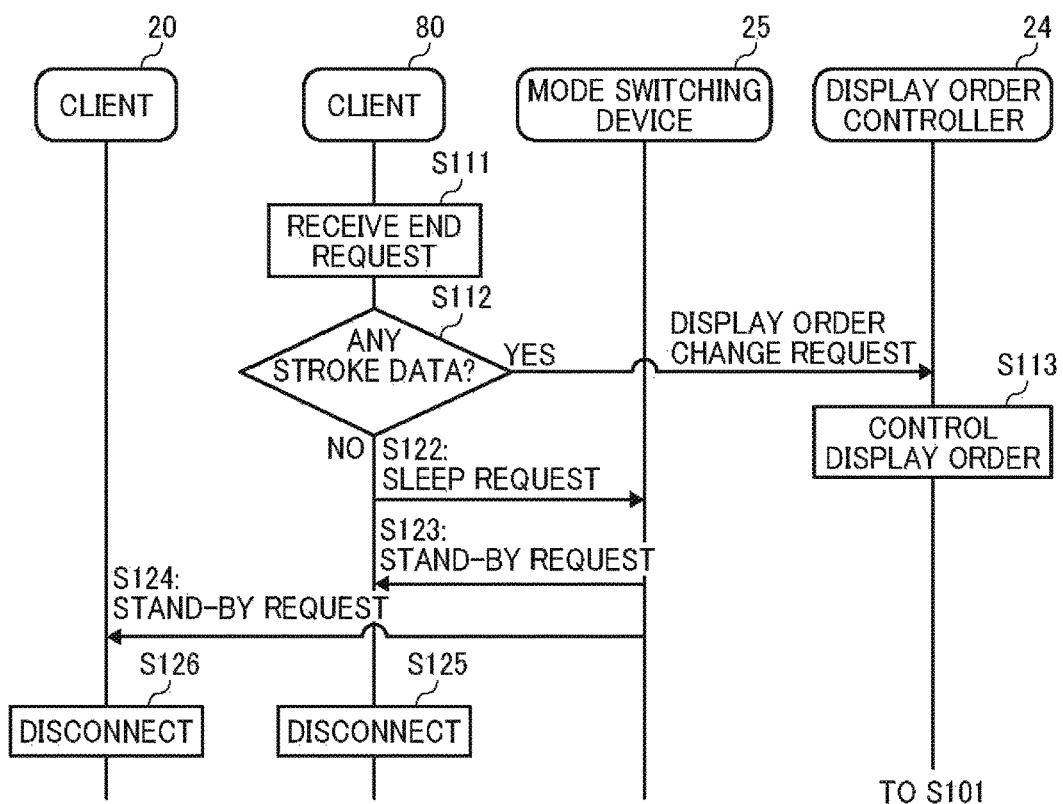

Now, operation of ending videoconference among the electronic whiteboards 2 and the PC 8 is described below. FIG. 17A and FIG. 17B are sequence diagrams each illustrating interactions among the components in the electronic whiteboard 2c in ending the videoconference.

Ending the videoconference when an image output from the client 20 in active is described with reference to FIG. 17A. When the user of the electronic whiteboard 2c touches the icon I1 in the combined image 140 with, for example, the electronic pen 4c, the client 20 receives a request for ending the videoconference (videoconference end request) (S101).

The communication controller 21 of the client 20 of the electronic whiteboard 2c transmits, to the mode switching device 25 of the same electronic whiteboard 2c, a request to switch a mode of the electronic whiteboard 2c to a sleep mode in response to receiving the videoconference stop request (S102). The request to switch the mode of the electronic whiteboard 2c may be referred to as a mode switching request.

When receiving the mode switching request for switching the mode to the sleep mode, the mode switching device 25 transmits a request to transition to a stand-by mode (stand-by request) to each application activated in the OS 2020 of the electronic whiteboard 2c. Through this, the mode switching device 25 transmits the stand-by request to each of the client 20 and the client 80 for transitioning to the standby mode (S103 and S104).

When receiving the stand-by request for transitioning to the standby mode, the client 80 causes the communication controller 81 and the display controller 82 that are set in advance to stop operation in the standby mode, to stop operating. Through this, the communication between the communication controller 81 and the PC 8 is disconnected (S105).

When receiving the stand-by request for transitioning to the standby mode, the client 20 causes the communication controller 21 and the drawing controller 22 that are set in advance to stop operation in the standby mode, to stop operating. Through this, the communication between the communication controller 21 and the electronic whiteboard 2a, which is the host terminal, is disconnected (S106).

Ending the videoconference when an image output from the client 80 is in active is described with reference to FIG. 17B. When the user of the electronic whiteboard 2c touches the icon I1 in the combined image 150 with, for example, the electronic pen 4c, the client 80 receives the videoconference stop request (S111).

When the stop request to finish the videoconference is accepted (S102), the client 80 determines whether the page data memory 220 in the memory 2000 stores the stroke data (S112). The client 80 determines whether the stroke data is stored in the page data memory in the memory 2000 according to whether the stroke data can be obtained from the page data memory 220 of the memory 2000. If the stroke data can be obtained, the determination in S112 is YES, and if not so, the determination in S112 is NO.

In S112, when the determination indicates that the stroke data is stored (S112: YES), the communication controller 81 of the electronic whiteboard 2c sends to the display order controller 24 of the same electronic whiteboard 2c the display order change request to change the display order of images such that the image output from client 20 is active.

The display order controller 24 of the electronic whiteboard 2c receives the display order change request. In response to receiving the displaying order change request, the display order controller 24 deactivates the image output from the client 80 that is the request source of the display order change request and, activates the image output from the client 20 (S113). Through this, the user can check the stroke image and save the images before ending the videoconference, if necessary. The processing of ending the videoconference after switching the screens is the same as the processing from S101 to S105 of FIG. 17A.

When the determination in S112 indicates that the stroke data is not stored (S112: NO), the communication controller 81 of the client 80 sends to the mode switching device 25 of the same electronic whiteboard 2c the mode switching request to switch the mode to the sleep mode (S122).

Processing after the mode switching device 25 receives the switching request to switch the mode to the sleep mode is substantially same as the processing of from S103 to S106, and the description thereof is omitted here (S123 to S126).

Second Embodiment

Figure 14:
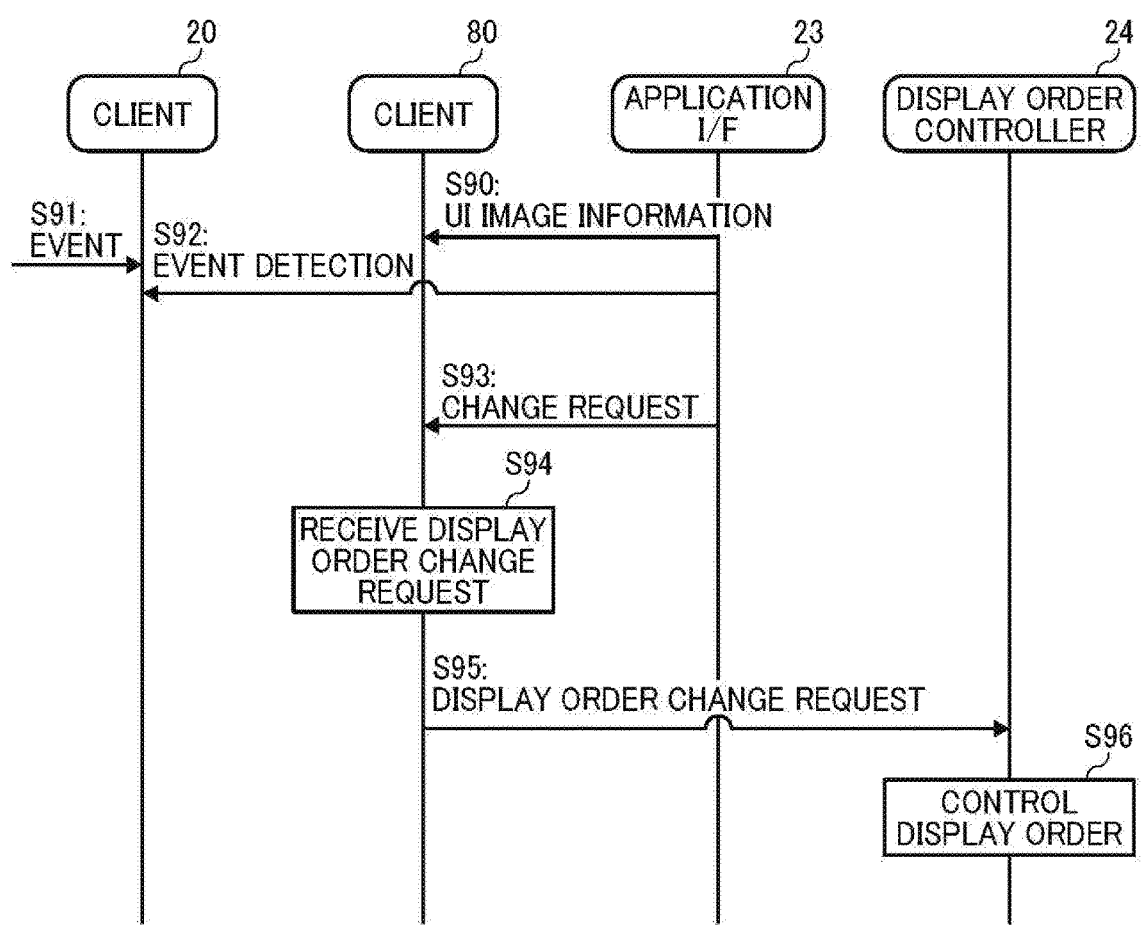
FIG. 14 is a sequence diagram illustrating interactions among components in an electronic whiteboard in controlling a display order of images, according to another one of the embodiments.

The following describes a second embodiment with reference to FIG. 14. The following description focuses on, in particular, difference between the second embodiment and the first embodiment. FIG. 14 is a sequence diagram illustrating operation of controlling a display order of images, according to the second embodiment. FIG. 14 illustrates interactions among components in the electronic whiteboard 2c.

The memory 2000 stores UI image data corresponding to a predetermined brightness icon (first communication icon) to be displayed with a predetermined brightness value, and a semi-brightness icon (second communication icon) to be displayed with half a value of the predetermined brightness value, as UI images for indicating a state in relation to the first communication application A11. The first communication icon indicates a state in which the first communication application A11 receives stroke data. The second communication icon indicates a state in which the first communication application A11 does not receive the stroke data.

When the display order changes in S86 of FIG. 13, the application I/F 23 sends UI image information on the second communication icon, which is one of UI images indicating a state in relation to the first communication application A11, to the client 80 (S90).

When the communication controller 81 of the client 80 receives the UI image information indicating the UI image data of the second communication icon, the display controller 82 acquires the UI image data corresponding to the second communication icon from the memory 2000 in S62 of FIG. 10B. Through this, a combined image output to the display order controller 24 in S64 of FIG. 10B includes a second communication icon I51 as illustrated in FIG. 12B. The user, accordingly, can visually recognize the second communication icon I51 even when the image output from the client 80 is controlled to be active and know that the first communication application A11 receives no stroke data.

The application I/F 23 detects a predetermined event that triggers change in the state of the first communication application A11. Examples of such a predetermined event include an event of receiving the stroke data with the first communication application A11.

The communication controller 21 of the electronic whiteboard 2c receives the stroke data sent from the communication controller 91 of the electronic whiteboard 2a, which is one of the predetermined events (S91).

The application I/F 23 of the electronic whiteboard 2c detects the predetermined event in which the communication controller 21 of the electronic whiteboard 2c receives the stroke data (S92).

The application I/F 23 of the electronic whiteboard 2c manages information on each of the UI images corresponding to one of the predetermined events. In the following description, the application I/F 23 manages the information on one of the UI images, specifically, the first communication icon, as a UI image indicating receiving the stroke data. In response to the detection of the event in which the stroked data is received, the application I/F 23 transmits a change request indicating the first communication icon corresponding to the event mentioned above, to the client 80 (S93).

Figure 12C:
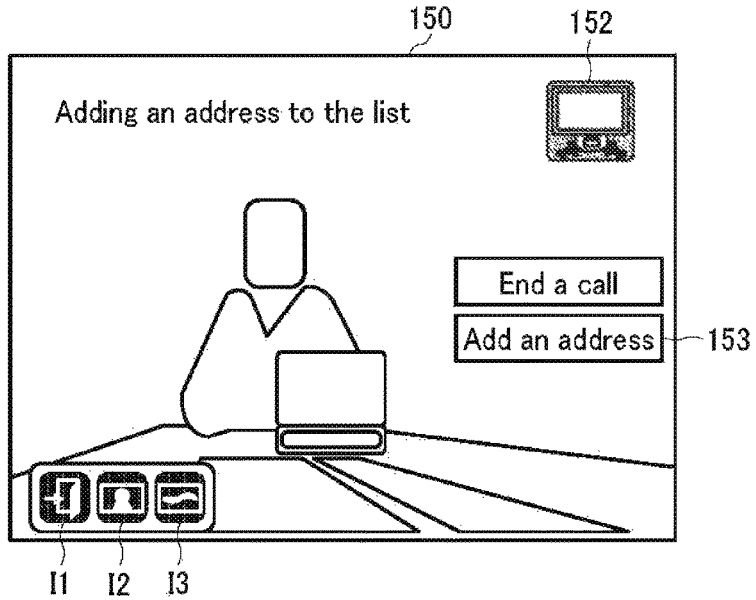

The communication controller 81 of the electronic whiteboard 2c receives the change request sent from the application I/F 23. The display controller 82 of the electronic whiteboard 2c selects the UI image data of the first communication icon out of the UI image data of the UI images stored in the memory 2000 based on the change request received in S62 of FIG. 10B. Through this, the UI image, i.e., the first communication icon, is output in S64 of FIG. 10B. FIG. 12C is an illustration of the combined image 150 in which a part of the combined image is changed based on the change request. As illustrated in FIG. 12C, the combined image 150 output in S64 of FIG. 10B includes the first communication icon I52. The user, accordingly, can visually recognize the first communication icon I52 even when the image output from the client 80 is controlled to be active and know that the first communication application A11 receives the stroke data.

When the user of the electronic whiteboard 2c touches a position where the icon I52 is displayed on the display 3c, the input device 83 receives an input of a request for changing a display order of images on the display 3c (display order change request) (S94).

In response to receiving the input of the display order change request, the communication controller 81 of the electronic whiteboard 2c sends information on the display order change request, which is for changing the display order of images on display 3c, to the display order controller 24 (S95).

The display order controller 24 of the electronic whiteboard 2c receives the display order change request. In response to receiving the display order change request, the display order controller 24 deactivates the image output from the client 80 that is a request source of the display order change request and activates the image output from the client 20 (S96). When the image output form the client 20 becomes active, the user of the electronic whiteboard 2c can confirm a stroke that is newly added. Additionally, the display order controller 24 may display each of the images output from both clients 20 and 80 at the same time in a manner that a size of the image output form the client 20 is larger than that of the image output from the client 80.

Third Embodiment

A third embodiment is now described below. The following description focuses on, in particular, difference between the third embodiment and the first and the second embodiments.

In the first and the second embodiments, there are two communication applications, the first communication applications A11 and the second communication B11, each of which is activated in the electronic whiteboard 2c. In the third embodiment, there are three or more communication applications each of which is activated in the electronic whiteboard 2c.

According to the third embodiment, when sending the change request in S83 of FIG. 13 and S93 of FIG. 14, the application I/F 23 sends an ID of an application in which the event occurs. Subsequently, the communication controllers 21 and 81 send the ID of the application received respectively in S83 of FIG. 13 and S93 of FIG. 14 when sending the display order change request to the display order controller 24. The display order controller 24 activates the image output from the application identified with the ID received and deactivate the other images output from the other applications. Through this, the display order controller 24 can determine which one of the display images in relation to one of the communication applications is to be activated, even when there are three or more communication applications.

Fourth Embodiment

A fourth embodiment is now described below. The following description focuses on, in particular, difference between the fourth embodiment and the first to the third embodiments. In each of the embodiments describe above, a case where the event is receiving the request from the other communication terminal or receiving the stroke data is described. However, the event may include receiving other information that can trigger transition of a current state of the communication application A11 or B11.

The application I/F 23 may detect the reception of the result of the authentication in S10 of FIG. 8 or S24 of FIG. 8 as an event (See S82 of FIG. 13 and S92 of FIG. 14). The present state of each of the communication applications A11 and B11 becomes online when the event described above occurs, so that the application I/F 23 sends the change request to change a current UI image to the icon corresponding to an online state, to the corresponding client 20 or 80.

The event detected with the application I/F 23 in each of S82 of FIG. 13 and S92 of FIG. 14 is not limited to the event received by the corresponding one of the client 20 and the client 80. For example, the application I/F 23, alternatively, may detect a response from the client 80 in S88 of FIG. 13. The present state of the second communication application B11 transitions during call communication, in response to the event described above. In response to the detection of the event, the application I/F 23 sends a change request to change a current UI image to an icon indicating a state of calling.

Fifth Embodiment

A fifth embodiment is now described below. The following description focuses on, in particular, difference between the fifth embodiment and the first to the fourth embodiments. In the fifth embodiment, the memory 2000 of the electronic whiteboard 2c stores display management database (DB) 2001 as a display management table. Table 5 is the display management table.

TABLE 5

| EVENT INFORMATION | FORMAT INFORMATION | DISPLAY CONTENTS |
|---|---|---|
| Receiving Call | Ticker | Receiving a call |
| Conference | Badge | badge 1 |
| Ending Conference | Ticker | Conference is ended |
| Receiving Notice: Update | Ticker | There is update |
| Receiving Request: Address Register | Ticker | You've got a request |
| Receiving Notice: First Login | Ticker | You need "First Login" |
| Receiving Notice: Login Succeeds | Ticker | You've successfully logged in |
| Receiving Notice: Login Fails | Ticker | You can't login |
| Receiving Notice: Double Login | Ticker | You've logged out |
| Disconnecting from Communication | Ticker | Network is disconnected |
| Detecting Error | Ticker | An error is occurring |
| Starting Sharing Screen | Dialog | dialog 1 |

In the display management table, for each predetermined event, event information that indicates the predetermined event to be detected with the application I/F 23, format information that indicates a format in which a notification of each event is displayed, and a display content to be displayed are associated to each other. The event information and the format information may each be an ID identifying each event and each format. The display content may be information including, for example, texts indicating the display contents, a badge, and a file name specifying a dialog.

The application I/F 23 of the electronic whiteboard 2c sends the change request including the event information identifying a specific event detected in S83 of FIG. 13 to the client 20 in response to the detection of the event with the client 80.

The communication controller 21 of the client 20 of the electronic whiteboard 2c receives the change request sent from the application I/F 23. The drawing controller 22 of the electronic whiteboard 2c searches the display management table using the event information included in the received change request to acquire the format information and the display content that are associated with the event information. The drawing controller 22, subsequently, generates an image of the acquired display content to be displayed in the format according to the obtained format information. The superimposer 22Y of the electronic whiteboard 2c superimposes the generated images with the other image layers in S56 of FIG. 10A. The superimposer 22Y, subsequently, outputs a combined image including the display content to the display order controller 24 in S57 of FIG. 10A. The display order controller 24 outputs the image data including the display content to the display 3c.

Figure 15A:
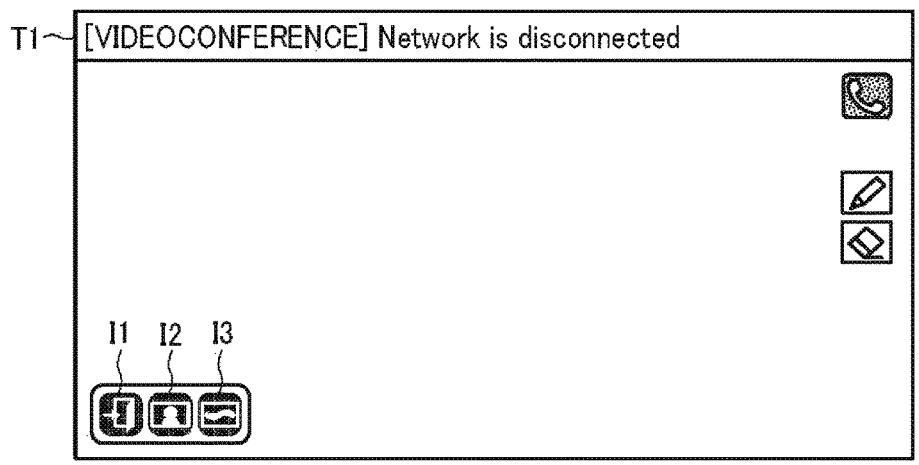
FIG. 15A, FIG. 15B, and FIG. 15C are illustrations of examples of a display screen.

FIG. 15A illustrates an example display screen when an event, "disconnected", is detected in S83 of FIG. 13. In the display management table, "disconnected" is associated with a format information, "ticker", and a display content, "network is disconnected". The drawing controller 22, accordingly, generates an image of ticker T that includes display of the above-mentioned display content. The drawing controller 22 may generate the image of the tinker T to be displayed only for a predetermined time, such as 10 seconds. This prevents decrease in visibility of the display screen, which may be caused by displaying the thicker T for a long time.

Figure 15B:
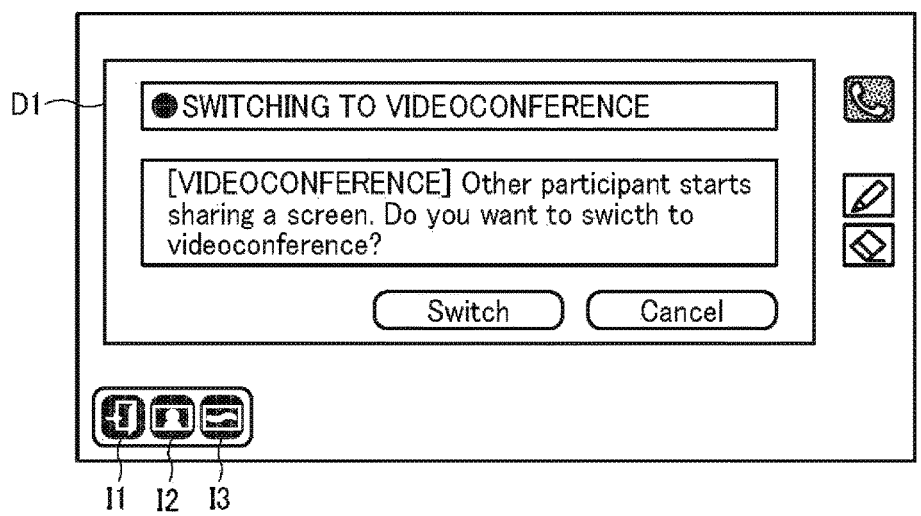

FIG. 15B illustrates another example display screen when an event, "sharing screen", is detected in S83 of FIG. 14. In the display management table, "sharing screen" is associated with a format information, "dialog", and a display content, "dialog D1". The drawing controller 22 generates a dialog image D1 based on the above mentioned information. With this dialog D1, the electronic whiteboard 2c can inform the user that other user has started sharing a screen to encourage the user to switch the screen. Using a dialog instead of a ticker as the event, "sharing screen", mentioned above, can effectively increase the chances for the user to switch the screen to a shared screen. This may be applied specifically in a case where the user cannot communicate with the other users unless the screen is switched to the shared screen.

Figure 15C:
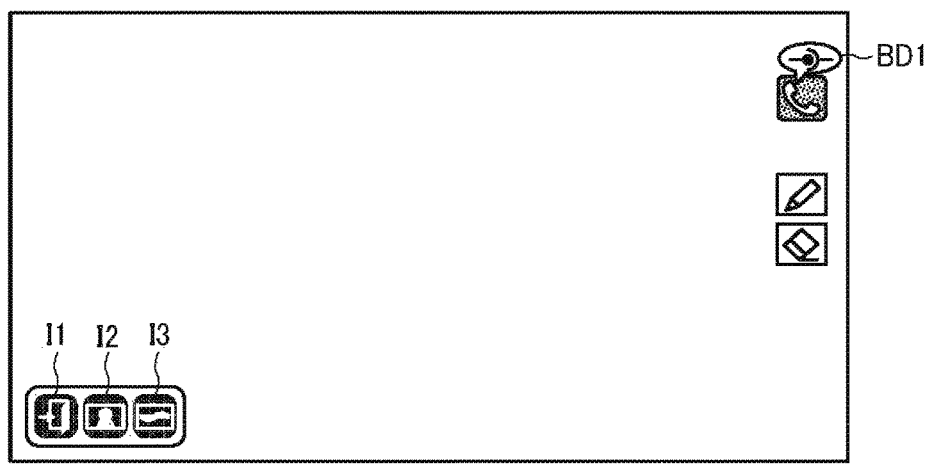

FIG. 15C illustrates still another example display screen when an event indicating presence during the "videoconference" is being carried out, is detected in S83 of FIG. 13. In the display management table, "videoconference" is associated with a format information, "badge", and a display contents, "badge BD1". The drawing controller 22 generates an image of the badge BD 1 based on the above-mentioned information. The electronic whiteboard 2c can inform the user that the videoconference is going on with the badge BD1. In the electronic whiteboard 2c, a position and an area of the badge BD1 is set in advance not to disturb other interface images. This allows the electronic whiteboard 2c to display the badge BD1 continuously during the videoconference without disturbing other operation performed by the user.

In the embodiment described above, a case where the application I/F 23 detects an event occurring in the client 80 and outputs information corresponding to the event in the client 20 is described. In a case of opposite direction, where the application I/F 23 detects an event occurring in the client 80 and outputs information corresponding to the event in the client 20, the processing is performed substantially in the same way. However, a destination of the information indicating the event sent from the application I/F 23 is the client 80, and the processing, which is performed with the drawing controller 22 when the destination is the client 20, is performed with the display controller 82.

Sixth Embodiment

A sixth embodiment is now described below. The following description focuses on, in particular, difference between the sixth embodiment and the first to the fifth embodiments.

Figure 16A:
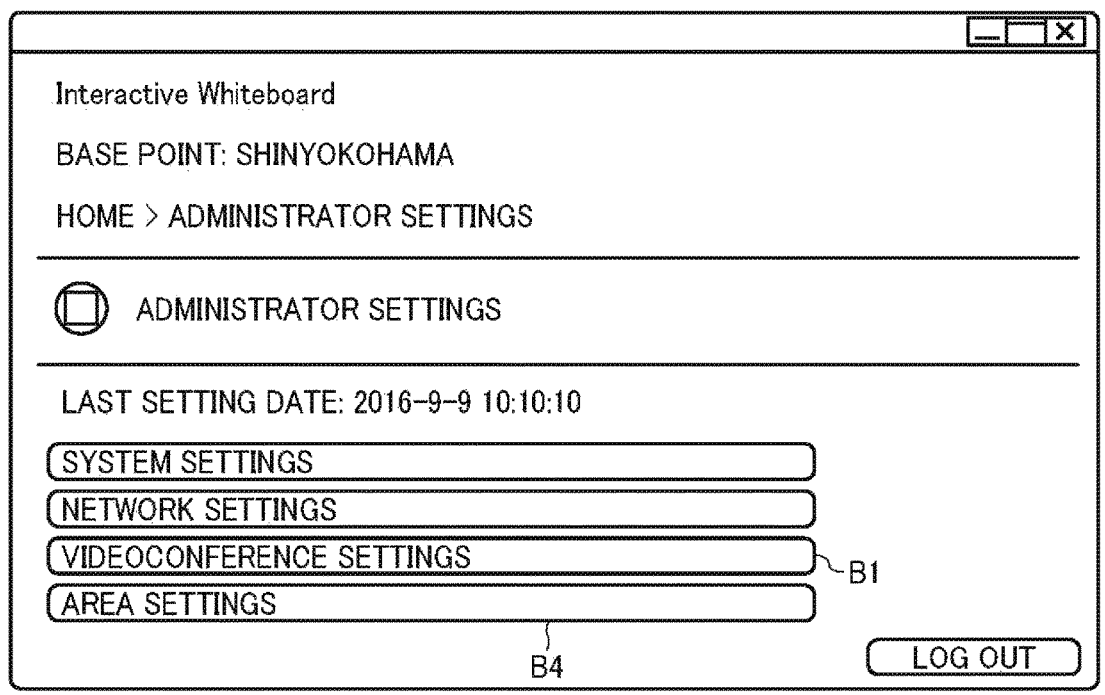
FIG. 16A and FIG. 16B are illustrations of examples of a display screen.

The page data memory 220 of the electronic whiteboard 2c stores a function-setting screen and a videoconference-setting screen. The page processor 22Z of the electronic whiteboard 2c obtains the function-setting screen stored in the page data memory 220 at a predetermined time, for example, a time of activation or a time when a request input by the user is received. The superimposer 22Y outputs the combined image including the acquired function setting screen to the display order controller 24 in S57 of FIG. 10A. The display order controller 24 outputs image data including the function-setting screen to the display 3c. FIG. 16A illustrates an example of the function setting screen. The function-setting screens include a button B1 for transitioning to a videoconference-setting screen.

Figure 16B:
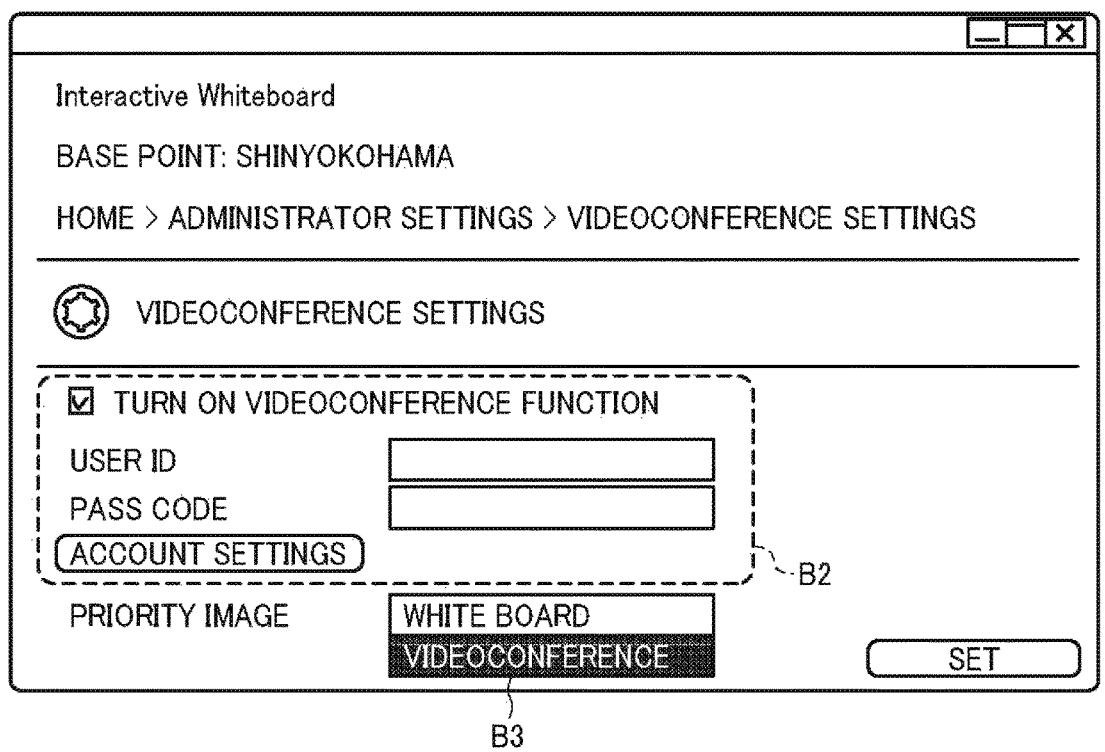

When the button B1 displayed on the display 3c is touched by the user with, for example, the electronic pen 4c, the page processor 22Z acquires the videoconference-setting screen stored in the page data memory 220. The superimposer 22Y outputs the combined image including the obtained videoconference setting screen to the display order controller 24 in S57 of FIG. 10A. The display order controller 24 outputs the image data including the videoconference setting screen to the display 3c. FIG. 16B illustrates an example of the videoconference setting screen.

When a check box indicating selection of a videoconference function in an entry field area B2 in the videoconference setting screen is marked and a user ID and a pass code are input by the user, the client 20 stores the user ID and the pass code input by the user in the memory 2000. When the electronic whiteboard 2 is activated after these settings, the client 80 requests for login to the management system 50 automatically based on the user ID and the pass code stored in the memory 2000 without requiring the user input of the user ID and the pass code.

Additionally, when the videoconference is selected as an active screen having a priority via an entry field B3 in the videoconference setting screen by the user, the client 20 stores the information indicating the videoconference screen as a default screen that is preferentially activated. Due to this, the display order controller 24 deactivates the image data output from the client 20 and activates the image data output from the client 80 in S71 of FIG. 13 based on the information indicating the videoconference screen stored in the memory 2000, and outputs the display image to the display 3c.

Additionally, the videoconference setting screen illustrated in FIG. 16A includes a button B4 for setting an area and a language. When the user of the electronic whiteboard 2c touches the button B4 using, for example, the electronic pen 4c, the client 20 receives a request for setting an area where the electronic whiteboard 2c is used. After the setting, the page processor 22Z of the electronic whiteboard 2c may generate an image according to the set area. For example, when Japan is set as an area, the page processor 22Z may output the videoconference-setting screen without including the button B1 for setting the videoconference. As another example, America (U.S.) is set as an area, the page processor 22Z may output the videoconference screen in English that is set in advance according to the videoconference-setting screen.

Alternatively, by causing a PC to connect to the first communication network 9a or the second communication network 9b of FIG. 1 and causing a web browser on the PC to access an IP address of any desired one of the electronic whiteboards 2, the PC displays the videoconference setting screen of the electronic whiteboard 2 to allow the user to set the items and the values described above.

Seventh Embodiment

A seventh embodiment is now described below. The following description focuses on, in particular, difference between the seventh embodiment and the first to the sixth embodiments.

The page data memory 220 of the electronic whiteboard 2c stores UI image data corresponding to UI images (user interface) including an icon I4 for activating the second communication application B11 used for the videoconference, an icon I5 for displaying a screen output with the second communication application B11 for the videoconference in a manner that a screen has the maximum size and comes to the top, and an icon I6 for minimizing the screen output with the second communication application B11 for the videoconference.

Figure 18A:
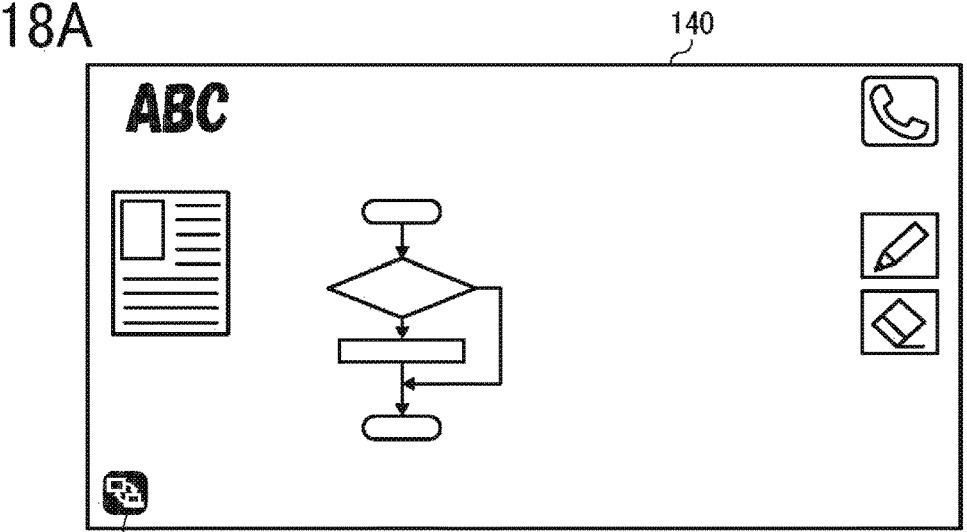
FIG. 18A, FIG. 18B, and FIG. 18C are illustrations of examples of a display screen.
Figure 18B:
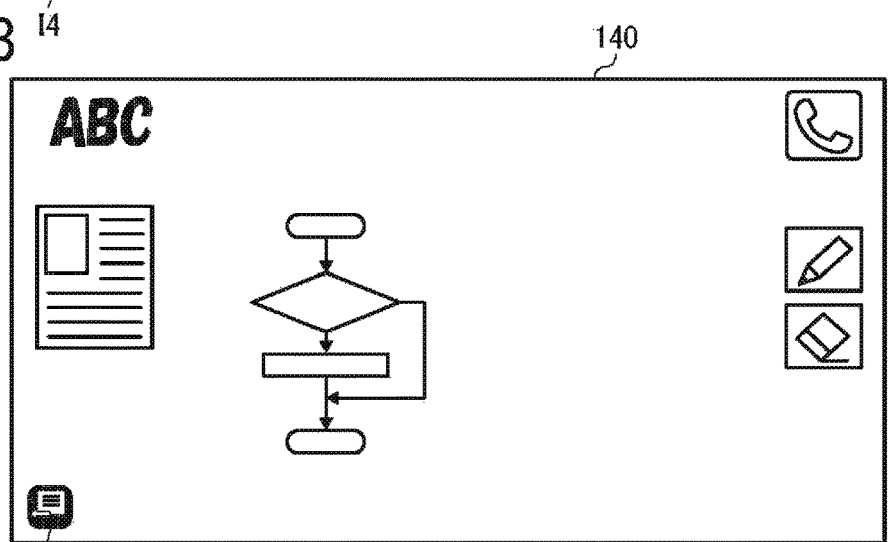
Figure 18C:
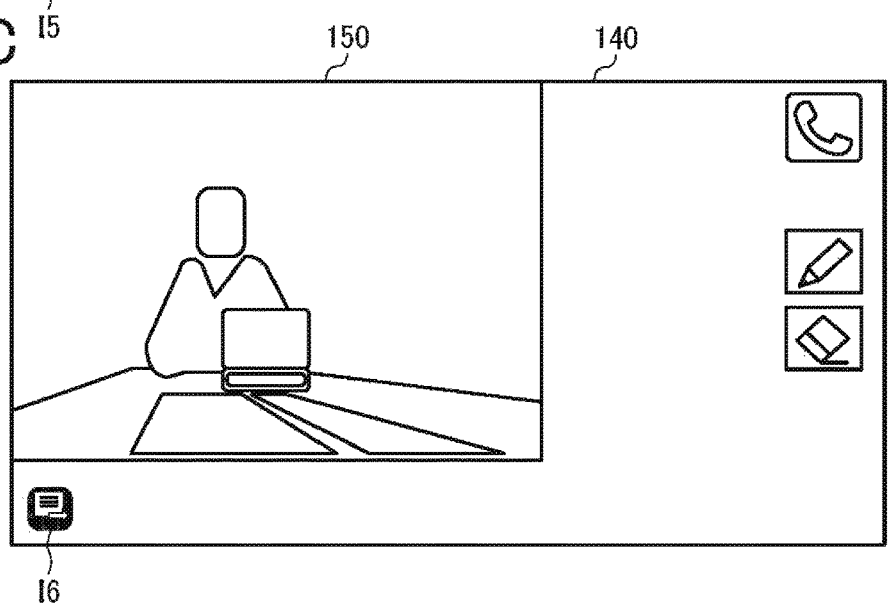

When the second communication application B11, which is used for the videoconference, is not activated, the page processor 22Z of the electronic whiteboard 2c acquires the UI image data corresponding to the icon I4 in S55 of FIG. 10A. When the second communication application B11, which is used for the videoconference, is activated but the output of the second communication application B11 is inactive, the page processor 22Z acquires the image data corresponding to the icon I5 in S55 of FIG. 10A. When the application B11, which is used for the videoconference, is activated and the output of the application B11 is active, the page processor 22Z acquires the image data corresponding to the icon I6 in S55 of FIG. 10A. FIG. 18A, FIG. 18B, and FIG. 18C are examples of the display 3c in which the icon I4, the icon I5, and the icon I6 are acquired, respectively.

Figure 19A:
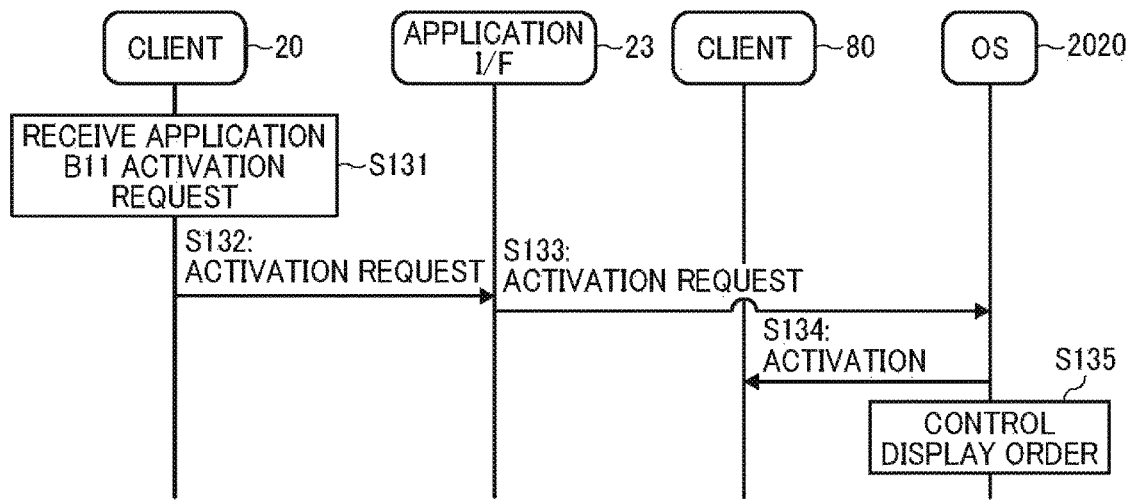
FIG. 19A, FIG. 19B, and FIG. 19C are sequence diagrams each illustrating interactions among the components in the electronic whiteboards in processing a request.

FIG. 19A is a flowchart illustrating an operation of the electronic whiteboard 2c in selecting the icon I4. With this operation, the client 20 of the electronic whiteboard 2c receives a request for activating the second communication application B11, which is for the videoconference (hereinafter, this request is referred to as an activation request) (S131).

The communication controller 21 of the electronic whiteboard 2c sends the received activation request to the application I/F 23 of the same electronic whiteboard 2c (S132). The application I/F 23 sends the received activation request to the OS 2020 of the same electronic whiteboard 2c (S133).

The OS 2020 activates the application B11 according to the received activation request (S134). The display order controller 24 of the OS 2020 activates an image output with the second communication application B11 and deactivates an image output with the first communication application A11 (S135).

Figure 19B:
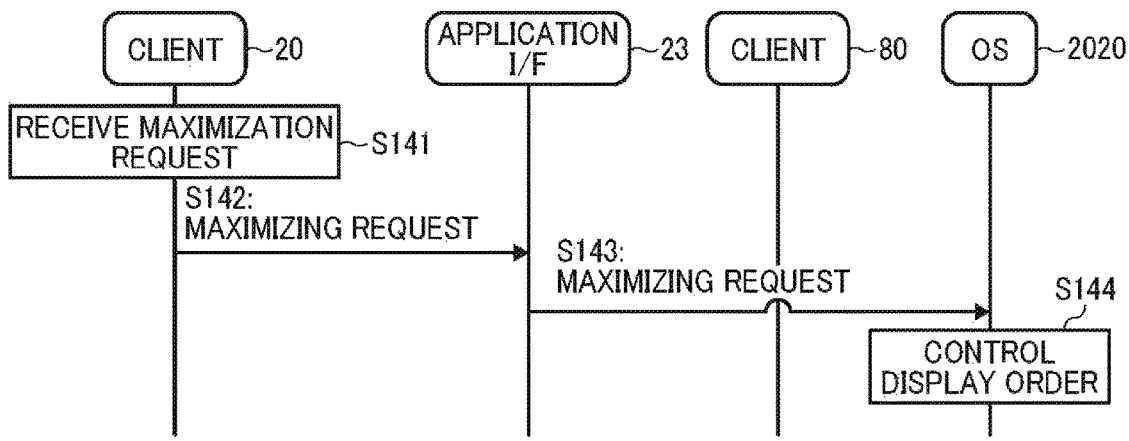

FIG. 19B is a flowchart illustrating an operation of the electronic whiteboard 2c in selecting the icon I5. With this operation, the client 20 of the electronic whiteboard 2c receives a request for displaying the image output with the second communication application B11, which is used for the videoconference, in a manner that an image has the maximum size (hereinafter, this request is referred to as a maximizing request) (S141).

The communication controller 21 of the electronic whiteboard 2c sends the received maximizing request to the application I/F 23 of the same electronic whiteboard 2c (S142). The application I/F 23 sends the received maximizing request to the display order controller 24 of the OS 2020 of the same electronic whiteboard 2c (S143).

The display order controller 24 of the OS 2020 deactivates an image output with the first communication application A11 and activates an image output with the second communication application B11 in a manner that the image size is maximized according to the received maximizing request (S144).

Figure 19C:
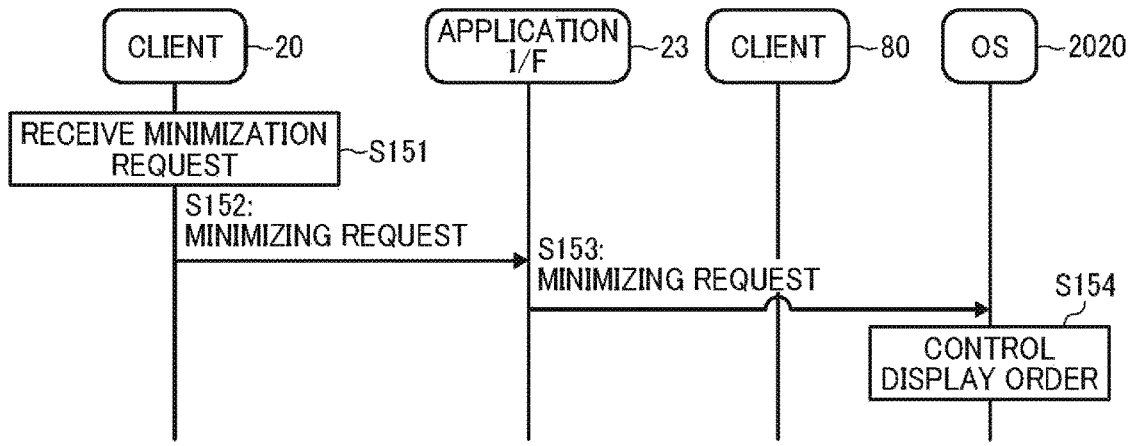

FIG. 19C is a flowchart illustrating an operation of the electronic whiteboard 2c in selecting the icon I6. With this operation, the client 20 of the electronic whiteboard 2c receives a request for minimizing the image output with the second communication application B11, which is used for the videoconference, (hereinafter, this request is referred to as a minimizing request) (S151).

The communication controller 21 of the electronic whiteboard 2c sends the received minimizing request to the application I/F 23 of the same electronic whiteboard 2c (S152). The application I/F 23 sends the received minimizing request to the display order controller 24 of the OS 2020 of the same electronic whiteboard 2c (S153).

According to the received minimizing request, the display order controller 24 of the OS 2020 deactivates an image output with the second communication application B11 in a manner that the image is minimized and activates an image output with the first communication application A11 (S154).

In the seventh embodiment describe above, the image output with the first communication application A11 is larger than the image output with the second communication application B11 and any one of the icons I4, I5, and I6 is always displayed. For example, when the image output with the first communication application A11 is smaller than the image output with the second communication application B11, the icon I4, I5, or I6 may be displayed with the image output with the second communication application B11. The processing in this case is performed substantially in the same way as the processing from S131 to S154, except for the processing performed with and to the client 20, in which, namely, the client 20 is replaced with the client 80 in this case.

According to one or more of the embodiments described above, the communication controller 21 of the electronic whiteboard 2c (one example of the transmitting and receiving means) transmits and receives the a stroke image (one example of a first image) corresponding to stroke data (one example of content data) transmitted to and received from the electronic whiteboard 2a (one example of other communication terminal) using first communication. The communication controller 81 (one example of transmitting and receiving unit) of the electronic whiteboard 2c transmits to and receives from the PC 8 (one example of other terminal) with second communication a video image (one example of a second image) in association with video image data (one example of the content data). The drawing controller 22, the display controller 82, and the display 3c (one example of displaying means) of the electronic whiteboard 2c display the icons I2 and I3 (examples of a display instruction image) that receives an instruction of displaying at least one of the stroke image and the video image, and the icon I1 (one example of a stop instruction image) that receives an instruction of stopping displaying at least one of the stroke image and the video image according to the instruction and stopping the first communication and the second communication (one example of display processing). This allows the user to stop both the first communication and the second communication by operating the icon I1, resulting in improvement of usability of the electronic whiteboard 2c.

When input operation via the icon I1 of the combined image 140 or the icon I1 of the combined image 150 is accepted, the mode switching device 25 (one example of state changing means) of the electronic whiteboard 2c causes the OS 2020 to be in a sleep mode so that both the first communication and the second communication are stopped (one example of stopping processing). This allows the user to stop both the first communication and the second communications by operating the icon I1.

The first communication application A11 (one example of a first application) for establishing the first communication and the second communication application B11 (one example of a second application) for establishing the second communication are in active in the electronic whiteboard 2c. The mode switching device 25 (one example of stopping means) of the electronic whiteboard 2c stops both the first communication and the second communication without stopping the activation of the first communication application A11 and the second communication application B11 by causing the OS 2020 to transition to the sleep mode. This allows the electronic whiteboard 2c to establish the first communication and the second communication smoothly when restarting the videoconference.

The content data transmitted and received through the first communication is stroke data, and the content data transmitted and received through the second communication is video image data. The page data memory 220 built in the memory 2000 (one example of managing means) of the electronic whiteboard 2c manages the stroke data in association with stroke output from the display controller 82. When the instruction to stop the communication is received via the icon I1 of the combined image 150 and the memory 2000 manages the stroke data, the display order controller 24 makes the combined image 140 to be in active to be displayed. Through this, the electronic whiteboard 2c allows the user to check a stroke image before stopping the communication.

The application I/F 23 of the electronic whiteboard 2c sends information indicating an event occurring in the second communication due to the second communication application B11 to the first communication application A11. The display 3c outputs a notification (one example of information) corresponding to the information indicating the event by processing of the first communication application A11. With the notification, the electronic whiteboard 2c allows the user to determine whether to stop the communication.

The display management table built in the memory 2000 (one example of managing means) of the electronic whiteboard 2c manages information indicating an output format in association with the information indicating an event. The first communication application A11 outputs a notification in an output format indicated with the information managed in the display management table in association with an event indicated with the information, when receiving the information indicating the event. Through this, the electronic whiteboard 2c can output the notification in an appropriate format according to an event detected.

Each of the first communication application A11, the second communication application B11, and the I/F application C11 may be recorded in a file in a format installable or executable on a computer-readable recording medium for distribution. Examples of such recording medium include, but are not limited to, compact disc-recordable (CD-R), digital versatile disc (DVD), and Blu-ray disc. In addition, a memory storing any one of the above described control programs, such as a recording medium including a CD-ROM or a HDD, may be provided in the form of a program product to users within a certain country or outside that country.

Any one of the electronic whiteboards 2, the PC 8, and the management system 50 may be implemented as a single apparatus or a plurality of apparatuses to which divided portions (functions) are allocated.

Each of the functions of the described embodiments may be implemented by one or more processing circuits or circuitry. Processing circuitry includes a programmed processor, as a processor includes circuitry. A processing circuit also includes a device such as an application specific integrated circuit (ASIC), digital signal processor (DSP), field programmable gate array (FPGA), and conventional circuit components arranged to perform the recited functions. The processing circuit herein includes, for example, devices such as a processor that is programmed to execute software to implement functions, like a processor with electronic circuits, an application specific integrated circuit (ASIC) that is designed to execute the above functions, and a circuit module known in the art.

Although the embodiments of the disclosure have been described and illustrated above, such description is not intended to limit the disclosure to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. A communication terminal, comprising:
a receiver to:
receive first content data from a counterpart communication terminal with a first communication; and
receive second content data from the counterpart communication terminal with a second communication,
wherein the first communication is started by a first communication application, and the second communication is started by a second communication application; and
circuitry to control a display to display:
a first image generated based on the first content data;
a second image generated based on the second content data;
a first instruction image for accepting a first instruction to display one of the first image and the second image;
a second instruction image for accepting a second instruction to cause the first communication application to end the first communication, and the second instruction causes the second communication application to end the second communication; and
a memory to store the first content data on a first image layer and the second content data on a second image layer,
wherein the circuitry controls the display to further display, when the first communication application is active, the first image layer to be visible to a user side while preventing display of the second image layer, and display a second communication event indicator on a layer closer to the user side than the first image layer that indicates an event that occurs in the second communication.

2. The communication terminal of claim 1, wherein the circuitry further ends the first communication and the second communication in response to reception of the second instruction.

3. The communication terminal of claim 2, wherein the circuitry ends the first communication and the second communication while keeping both a first communication application used for establishing the first communication and a second communication application used for establishing the second communication active.

4. The communication terminal of claim 1, wherein the first content data is stroke data,
wherein the second content data is video image data,
wherein, when the stroke data stored in the memory is being processed when the second instruction is received, the circuitry controls the display to display the first image to irrespective of the first instruction.

5. The communication terminal of claim 4, wherein the circuitry controls the display to further display, in addition to the first image being displayed, the second communication event indicator indicating an event that occurs in the second communication, in response to receiving information on the event from the counterpart communication terminal.

6. The communication terminal of claim 5, wherein the memory stores, for each one of one or more events, format information indicating a format used in outputting the event information, in association with information on the event, and
the circuitry controls the display to display the event information in the format based on the format information stored in association with the information on the event that is received from the counterpart communication terminal.

7. The communication system, comprising:
the communication terminal of claim 1; and
the counterpart communication terminal that communicates with the communication terminal with the first communication.

8. The communication system, comprising:
the communication terminal of claim 1; and
the counterpart communication terminal that communicates with the communication terminal with the second communication.

9. The communication system of claim 8, further comprising a management system to manage the second communication.

10. A display method, comprising:
receiving first content data from a counterpart communication terminal with a first communication;
receiving second content data from the counterpart communication terminal with a second communication,
wherein the first communication is started by a first communication application, and the second communication is started by a second communication application;
displaying, on a display:
a first image generated based on the first content data;
a second image generated based on the second content data;
a first instruction image for accepting a first instruction to display one of the first image and the second image; and
a second instruction image for accepting a second instruction to cause the first communication application to end the first communication, and the second instruction causes the second communication application to end the second communication; and
storing, at a memory, the first content data on a first image layer and the second content data on a second image layer,
wherein the method further includes displaying, when the first communication application is active, the first image layer to be visible to a user side while preventing display of the second image layer, and displaying a second communication event indicator on a layer closer to the user side than the first image layer that indicates an event that occurs in the second communication.

11. A non-transitory recording medium storing a plurality of instructions which, when executed by one or more processors, cause the processors to perform a display method, comprising:

receiving first content data from a counterpart communication terminal with a first communication;

receiving second content data from the counterpart communication terminal with a second communication, wherein the first communication is started by a first communication application, and the second communication is started by a second communication application;

displaying, on a display:

a first image generated based on the first content data;

a second image generated based on the second content data;

a first instruction image for accepting a first instruction to display one of the first image and the second image; and a second instruction image for accepting a second instruction to cause the first communication application to end the first communication, and the second instruction causes the second communication application to end the second communication; and storing, at a memory, the first content data on a first image layer and the second content data on a second image layer, wherein the method further includes displaying, when the first communication application is active, the first image layer to be visible to a user side while preventing display of the second image layer, and displaying a second communication event indicator on a layer closer to the user side than the first image layer that indicates an event that occurs in the second communication.

12. The communication terminal of claim 1, wherein the circuitry further controls the display to further display, when the second communication application is active, a first communication event indicator on the second image layer that indicates an event that occurs in the first communication, wherein only one of the first communication event indicator and the second communication event indicator are displayed at any time.

* * * * *